United States Patent
Seaman et al.

(10) Patent No.: US 6,826,158 B2
(45) Date of Patent: Nov. 30, 2004

(54) BROADBAND TREE-CONFIGURED RING FOR METROPOLITAN AREA NETWORKS

(75) Inventors: Michael J. Seaman, Mountain View, CA (US); Vipin Jain, Santa Clara, CA (US)

(73) Assignee: Onfiber Communications, Inc., Englewood, CO (US)

( * ) Notice: Subject to any disclaimer, the term of this patent is extended or adjusted under 35 U.S.C. 154(b) by 825 days.

(21) Appl. No.: 09/796,825

(22) Filed: Mar. 1, 2001

(65) Prior Publication Data

US 2002/0009092 A1 Jan. 24, 2002

Related U.S. Application Data

(63) Continuation-in-part of application No. 09/634,566, filed on Aug. 9, 2000
(60) Provisional application No. 60/186,470, filed on Mar. 2, 2000.

(51) Int. Cl.$^7$ .............................................. H04L 12/28
(52) U.S. Cl. ...................... 370/254; 370/255; 370/258; 370/406
(58) Field of Search ................................. 370/217, 221, 370/222, 223, 224, 225, 228, 242, 252, 254, 255, 256, 258, 389, 403, 404, 405, 406, 408, 424, 452

(56) References Cited

U.S. PATENT DOCUMENTS

| | | |
|---|---|---|
| 4,872,157 A | 10/1989 | Hemmady et al. |
| 4,872,158 A | 10/1989 | Richards |

(List continued on next page.)

OTHER PUBLICATIONS

Tolley, "Strategic Directions Moving the Decimal Point: An Introduction to 10 Gigabit Ethernet", Cisco Systems White Paper, © 2000, pp. 1–17.

(List continued on next page.)

Primary Examiner—Chi Pham
Assistant Examiner—Anh Vu H Ly
(74) Attorney, Agent, or Firm—Haynes Beffel & Wolfeld LLP

(57) ABSTRACT

A method for configuring a network, and a network configured according to such method, are provide in which a communication links laid out in a ring in a metropolitan area are partitioned into link segments, and managed according to a spanning tree protocol. The switches are configured to establish unique, mesh or tree type network configurations suitable for application to communication media arranged to support ring-based protocols. The method is used for connecting communication links arranged in a plurality of rings, which traverse a plurality of collocation sites in a metropolitan area. The method comprises configuring switches in the plurality of collocation sites to partition rings in the plurality of rings into a plurality of link segments providing point to point paths between switches at collocation sites in the plurality of collocation sites. The switches and link segments are managed according to a spanning tree protocol. In one embodiment of the invention, the configuring of switches includes allocating a first set of the link segments as a first ring and a second set of the link segments as a second ring, breaking the first and second rings by blocking transmission on a link segment in the first ring between the first pair of collocation sites, and by blocking transmission on a link segment in the second ring between a second pair of collocation sites. In addition, the method includes cross-connection the first and second rings by a communication link.

33 Claims, 19 Drawing Sheets

U.S. PATENT DOCUMENTS

| | | | |
|---|---|---|---|
| 5,517,498 A | | 5/1996 | Hauris et al. |
| 5,881,131 A | | 3/1999 | Farris et al. ............... 379/27 |
| 5,935,209 A | | 8/1999 | Budhraja et al. ........... 709/223 |
| 6,061,335 A | * | 5/2000 | De Vito et al. ............. 370/258 |
| 6,226,111 B1 | * | 5/2001 | Chang et al. ............... 370/223 |
| 6,295,146 B1 | * | 9/2001 | Nathan et al. ............. 370/222 |
| 6,304,575 B1 | * | 10/2001 | Carroll et al. ............... 370/408 |
| 6,373,826 B1 | * | 4/2002 | Russell et al. ............. 370/256 |
| 6,598,092 B2 | * | 7/2003 | Tomizawa et al. .......... 370/222 |
| 6,674,727 B1 | * | 1/2004 | Carroll et al. ............... 370/254 |
| 6,707,789 B1 | * | 3/2004 | Arslan et al. ............... 370/218 |
| 6,744,769 B1 | * | 6/2004 | Siu et al. ................... 370/222 |
| 2002/0023170 A1 | * | 2/2002 | Seaman et al. ............. 709/235 |
| 2002/0038253 A1 | * | 3/2002 | Seaman et al. ............. 709/238 |

OTHER PUBLICATIONS

"*Spatial Reuse Protocol Technology*", Cisco Systems White Paper, © 2000, pp. 1–37.

SONET ATG's Communications Technology Guide Series, © 1996 Sprint Communications LP, pp. 1–42.

"*Building 10 Gigabit/DWDM Metro Area Networks*" The Technology Guide Series, © 2000 The Applied Technologies Group, Inc., pp. 1–49.

"*Gigabit Ethernet at the Core of the Network*", ATG's Communications & Networking Technology Guide Series, © 1997 The Applied Technologies Group, pp. 1–41.

IEEE Draft P802.1 w/D9, Supplement to ISO/IEC 15802–3 (IEEE Std 802.1D) Information Technology—Telecommunications and Information Exchange Between Systems—Local and Metropolitan Area Networks—Common Specifications—Part 3: Media Access Control (MAC) Bridges: *Rapid Reconfiguration*, Jan. 12, 2001, pp. 1–120.

IEEE P802/D28—Draft Standard for Local and Metropolitan Area Networks: Overview and Architecture, (Rev. of IEEE Std 802–1990), Feb. 2, 2001, pp. 1–42.

* cited by examiner

BROADBAND TREE-CONFIGURED RING FOR METROPOLITAN AREA NETWORKS

PROVISIONAL APPLICATION DATA

The present application claims the benefit under 35 U.S.C. §111(b) and 35 U.S.C. §119(e) of the provisional application No. 60/186,470, filed Mar. 2, 2000, entitled BROADBAND SERVICE NETWORK AND E-COMMERCE PROVISIONING SYSTEM, naming inventors Michael Seaman, Vipin Jain, Gary Jaszewski, Bob Klessig, Peter Van Peenen, and David Braginsky.

CONTINUING APPLICATION DATA

The present application is a continuation-in-part of co-pending U.S. patent application Ser. No. 09/634,566, filed: Aug. 9, 2000, entitled E-COMMERCE SYSTEM FACILITATING SERVICE NETWORKS INCLUDING BROADBAND COMMUNICATION SERVICE NETWORKS, which is incorporated by reference as if fully set forth herein.

BACKGROUND OF THE INVENTION

1. Field of the Invention

The present invention relates to broadband communication services, and more particularly to network configuration of metropolitan area communication networks laid out in rings managed according to a spanning tree protocol.

2. Description of Related Art

In a metropolitan area, fiber optic cables are typically installed in rings to provide an alternate route diverse path in the case of physical failure or interruption of a fiber optic link. Some of the fiber or fiber transmission capacity in each ring is reserved for use in the face of such a failure. The rules used by the networking equipment to react to such failures are usually governed by protocols that assume that the network is configured as a ring or as a set of interconnected rings.

In an enterprise data network, fiber optic connections between packet switches are usually made point to point in a 'redundant, dual-homed, tree like' topology to facilitate rapid reconfiguration with the minimum loss of service. The revised spanning tree protocol under standardization in IEEE 802.1 is a suitable protocol for establishing the failover rules in the network. The recently completed link aggregation standard, IEEE Std. 802.3ad, is another—providing for resiliency of parallel links.

A leading protocol deployed in metropolitan area networks is SONET (Synchronous Optical NETwork). SONET is a digital transmission technology that provides high availability communication between switching nodes. In networks comprising communicating switching nodes connected by fiber links in a ring topology, SONET provides protection against the loss of communications between any pair of nodes due to failure of links or intervening nodes by using the alternate path in the ring topology.

While other network topologies, e.g. meshes, are capable of providing high availability through redundancy, fiber rings are especially important because (a) their simple topology lends itself to simple fast protection switching arrangements (b) wide deployment of SONET means fiber is often available and operationally configured in ring topologies.

Unfortunately deployment of SONET in a network comes at the expense of fully half the potential bandwidth of the fiber ring. An alternative would be to use only the fiber between a pair of nodes to support communication between them. This permits 'serial reuse' of the fiber ring to carry communication between other nodes. Such an approach is particularly attractive when data traffic is being carried. Unlike telephone traffic, data traffic, particularly that generated by TCP in the TCP/IP protocol suite, will adjust to increases or decreases in available transmission capacity. Serial reuse thus makes best use of the available resources in the normal case when failure has not occurred, while allowing the redundant connectivity of the ring to protect against failure.

The problem to be solved, then, is to make the best use of fiber rings for carrying IP (Internet Protocol) data traffic between nodes on the rings while retaining the benefits of the present SONET arrangements, notably (a) very rapid failover to backup links and switches typically within 50 milliseconds of a failure (b) timely delivery of traffic.

One available protocol is known as SRP (Serial Reuse Protocol) developed by Cisco Systems, Inc., San Jose, Calif., to support packet services on fiber rings. SRP is new media access protocol, providing mechanisms for 'healing' the ring in cases of failure, for determining where nodes (identified by their media access (MAC) address) are on the ring, and for confining traffic between the nodes to just that portion of the ring to allow reuse. Part of the operation of SRP gives priority to traffic already circulating on the ring (as opposed to traffic joining the ring) to ensure timeliness of delivery. Other organizations and individuals have also proposed similar services, introducing new protocols to provide frame relay like services on fiber rings. These solutions have the disadvantage that it is necessary to build special purpose hardware to support them.

Some proposals only work in ring topologies, or at least in topologies of interconnected rings. Growing the bandwidth of such a network beyond that naturally provided by a single ring typically involves the development of additional equipment supporting the specialized hardware, and may not be possible without disrupting the service provided by the ring.

It is desirable therefore to provide a network topology that is scalable and efficient as uses of networking are expanding, and which takes advantage of the existing deployed media arranged for ring based protocols in metropolitan area networks.

SUMMARY

This invention comprises a method for configuring a network, and a network configured according to such method, in which a communication links laid out in a ring in a metropolitan area are partitioned into link segments, and managed according to a spanning tree protocol. In various embodiments, the switches are configured according to the methods described above, establishing unique, mesh or tree type network configurations suitable for application to communication media arranged to support ring based protocols.

The method is used for connecting communication links arranged in a plurality of rings, which traverse a plurality of collocation sites in a metropolitan area. The method comprises configuring switches in the plurality of collocation sites to partition rings in the plurality of rings into a plurality of link segments providing point to point paths between switches at collocation sites in the plurality of collocation sites. The switches and link segments are managed according to a spanning tree protocol.

In one embodiment of the invention, the configuring of switches includes allocating a first set of the link segments as a first ring and a second set of the link segments as a second ring, breaking the first and second rings by blocking transmission on a link segment in the first ring between the first pair of collocation sites, and by blocking transmission on a link segment in the second ring between a second pair of collocation sites. In addition, the method includes cross-connection the first and second rings by a communication link. The communication link used for cross-connection in various embodiments is not part of the first and second rings, but consists of additional lengths of communication medium which extend between collocation sites in the first and second rings, such as other link segments of the same type of media, or other kinds of communication channels, such as high bandwidth wireless connections, or others. In one embodiment, the collocation sites in the first and second rings which are coupled by said communication link consists of collocation sites in which the first and second rings are broken. An ideogram illustrating this concept for heuristic purposes is shown in FIG. 2.

In one embodiment, the method includes aggregating a plurality of link segments between switches in different collocation sites to provide a single logical link with higher bandwidth between the collocation sites.

According to another embodiment of the invention, a metropolitan area network is provided. The metropolitan area network comprises a plurality of communication links, such as fiber-optic cable, arranged in a plurality rings which traverse a plurality of collocation sites in the metropolitan area. A plurality of switches is provided in the plurality of collocation sites, which are configured to partition rings in the plurality of rings into a plurality of link segments providing point to point paths between switches at the collocation sites. The plurality of switches and communication links is managed according to a spanning tree protocol.

According to one aspect of the invention, a communication system is provided using technology that has been developed within the communications, enterprise data networking, electronic commerce, and carrier service provider industries to provide service in new ways particularly complementary to a provisioning process and system described herein.

A foundation of industry standard products and practices in the following areas is used to construct the novel networks, including for one example:

Fiber optic transmission technology using WDM (wave division multiplexing) to carry additional bandwidth through the use of many 'colors' of light on a single fiber, controlled and Gigabit (or higher) ethernet packet switching technology to accept and deliver IP data from and to customers, providing a highly reliable service.

Electronic commerce technology to allow customers and their authorized agents to order, configure, and manage the communications services delivered and to enter into business agreements with other suppliers of services using the system's communication services.

In each of these areas a number of novel practices and inventions support and advance the communications network and services.

Configuration of links and link segments to facilitate rapid reconfiguration of interconnected packet switches is provided in support of the commercial provisioning system.

A set of rules and heuristics is provided for the use and configuration of fiber optic transmission facilities, purchased or leased in ring configurations, as a set of links comprising selected concatenated segments from a set of rings. The resulting configurations have benefits in networks including:

1) They allow the use of high bandwidth low cost enterprise data packet switching equipment in the collocation facilities, while providing high network availability through the use of rapid reconfiguration with redundant links and switches.
2) They allow the use of general mesh topologies to support redundancy, rather than restriction to rings or rings with extraordinary interconnection arrangements.

In addition to realizing these topologies by concatenating physical segments from rings, equipment is provided so that a link can comprise logical segments, each consisting for example of a wavelength of light transmitted and received by WDM (wavelength division multiplexing) equipment attached to the physical fiber segment running between two locations on a ring. Electronic switching of the transmitted information stream at each ring node from one wavelength on a segment to another wavelength on the next, or to an attached device, allows for electronic rearrangement of the set of links connected to each packet switch in the network.

Modification of the Spanning Tree for resilient redundant connection of an edge device to a network is provided in some embodiments in support of efficient provisioning. The IEEE 802.1 Spanning Tree provides for redundant connections within a network, where data transmitted from one attachment to the network to another is constrained to follow a loop free path. It reduces the physical topology of the network to an active topology that is both loop free ('tree') and fully connected ('spanning').

In the network, 'demarcation devices' situated on individual customer's premises can provide for redundant connections to the rest of the network. Selection of one link in preference to another can be achieved by use of the spanning tree or a similar protocol. However, only traffic that is transmitted by or destined for a given customer is allowed to reach that customer's demarcation device (a packet switch). It is not desirable that a demarcation device act as a transit link in the network, that would be used to ensure full connectivity from one part of the network to another, either during a reconfiguration of the network or while the active topology is stable. Rather the network should partition if there is no connectivity other than through a demarcation devices between the two halves.

In the past, the simple selection of one link or another for connection to the interior of a network has been performed by a simple physical layer redundancy scheme that interrogates the health of the links from a demarcation device switch to the network. One link is configured as a primary link and the secondary link is activated only if the primary fails a simple connectivity test to the remainder of the network, e.g. loss of the transmitted light signal.

The system improves on this prior arrangement, while not allowing the demarcation device to participate in the active topology of the network, by choosing the active link from the demarcation device to the network on the basis of the spanning tree information received by the device, but not allowing it to forward or generate spanning tree information. This arrangement protects against a failure in the network that causes the switch connected to by the demarcation device to be separated from the main body of the network.

Security arrangements for a packet switched data transmission network using LAN switches are provided. The network makes use of packet data switching equipment that is typically used in private data networks. While such equipment has facilities that can be used to construct ad-hoc security arrangements, the system's public service network requires a systematic approach to its security.

The network ensures that no data is ever delivered to a service interface other than the service interface(s) explicitly authorized by the customer whose network attached equipment transmits the data, and that no data is received on a service interface other than data from the service interface(s) explicitly authorized by the customer whose network attached equipment is receiving the data.

The mechanisms that the system uses to ensure such secure delivery include:

(a) The organization of switches within the network architecture and the placement of security functions within that architecture.

(b) Assuring a unique identity for each device connected to a service interface anywhere within the network.

(c) Checking that identity at points identified within the network (see a. above)

(d) Ensuring that the identity of each of the customers/parties controlling the assignment of service interfaces and the connections between them is securely known.

(e) Providing for the known delegation of control within the constraints imposed by (d) above.

The network architecture is distinguished by its use of switches organized into:

Demarcation devices. These are typically, but not necessarily, located on a single customer's premises. It is assumed that that customer will secure physical access to his or her own premises. Each demarcation device supports a number of service interfaces that the customer uses to connect to the network, and one or more 'drops' that connect to access ports on access switches (see below).

Access switches. These are located on premises physically secured, usually at a customer site linked by a communication media of choice, including for example fiber optic cable, to a collocation site in the metropolitan area network. In addition to access ports they have interior ports that connect to interior switches at the collocation sites within the network.

Interior switches. These form the heart of the network, typically in collocation sites of the metropolitan area network.

The identity of the connected device is ascertained by observing packets transmitted by the device at the service interface of the demarcation device. Each packet contains a source MAC address. This is captured by the service interface and a notification sent to the system managing the network using normal network management protocols. The management system assures itself that the MAC address is unique. Filters are configured on access ports to ensure that only packets with source MAC addresses checked in this way are accepted from the attached demarcation device. Similarly only packets from source addresses that are permitted to transmit to the demarcation device are allowed from the access port to the demarcation device.

Interior switches do not filter or otherwise constrain connections on the basis of the identities of devices attached to either the transmitting or receiving service interfaces. This allows the active topology maintained by interior switches to scale independently of the number of active connections through the network, and to reconfigure rapidly since information concerning individual connections does not have to be communicated or changed during reconfiguration.

A range of options is offered to customers to control changes to the source MAC address used on the interface, including automatic configuration, latching of a learnt address, explicit manual configuration, and identification of attempts at intrusion into the network.

The system is capable of extension to allow additional security protocols to establish the identity of the connecting system. Once that identity has been established, the MAC address of the transmitting system is used, as described above, to secure connections.

Disconnection and reconnection of the device can be detected, even if the same MAC address is used throughout. This protects against attempts to masquerade once a device identity has been established.

Provision of multiple connectivity options across a packet switched network, is supported by the network, including point-to-multipoint services. The network supports point-to-point connectivity between a pair of service interfaces, multipoint to multipoint switched LAN like connectivity between a set of service interfaces, and point to multipoint connectivity. This last provides for the equipment attached at one service interface, the 'root,' to be able to transmit to one or all other interfaces while equipment attached at those interfaces can only transmit to the root. This functionality supports serving many of a service provider's customers through a single connection to the network.

Spatial reuse in a packet based data network with a ring topology is accomplished in the preferred network configuration. The network architecture uses packet switches with rapid reconfiguration protocols and VLAN technology to constrain packets that might otherwise be broadcast or flooded to the necessary paths between access ports in the network. Thus a combination of existing standard technologies serves to support the same robust efficient communications goals sought by new non-standard equipment.

Other aspects and advantages of the present invention can be seen on review of the figures, the detailed description and the claims, which follow.

DETAILED DESCRIPTION

Figure 1:
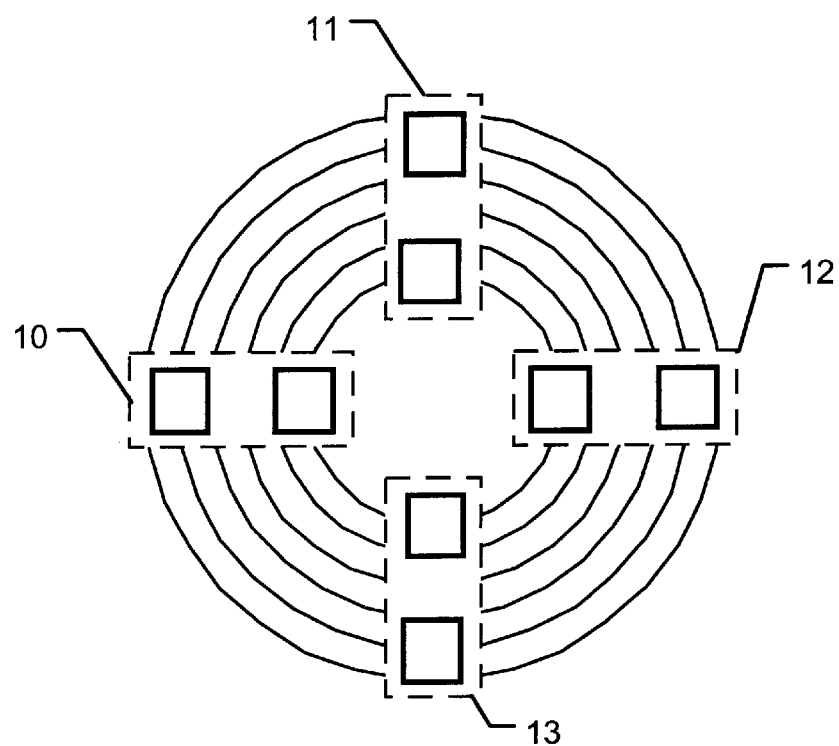
FIG. 1 illustrates a metropolitan area network arranged as a plurality of rings composed of lengths of communication media, such as fiber optic cable, between collocation sites, according to the prior art.

FIG. 1 shows an arrangement of a metropolitan area network, comprising collocation facilities 10, 11, 12, 13 connected by a plurality of fiber rings, each ring in the plurality providing a number of transmit and receive pairs. In each collocation site, the transmit and receive pairs in the ring can be connected to one of two (or more) switches in the collocation site, or patched through to form an uninterrupted link between collocation sites on either side of the collocation site in question.

Any of the fiber pairs can be aggregated to provide a single link of higher bandwidth between any two of the switches. If required, the fiber pairs can be aggregated in both directions around the ring to provide a route diverse aggregated, link, offering increased resilience to mass fiber breaks.

Figure 2:
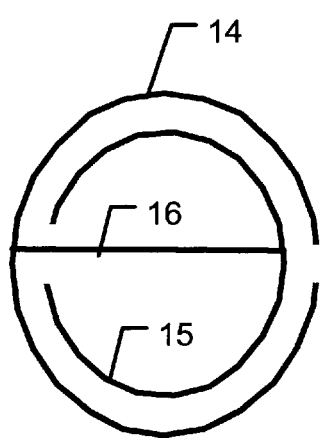
FIG. 2 is an ideogram illustrating heuristically one preferred approach to configuring the network as cross-connected broken rings, according to the present invention.

The network topologies according to a preferred embodiment are based on the heuristic depicted by the ideogram shown in FIG. 2. Two broken rings 14, 15 are cross-connected by a link 16 from a collocation site where one of the rings is broken to a collocation site where the other ring is broken.

Figure 3:
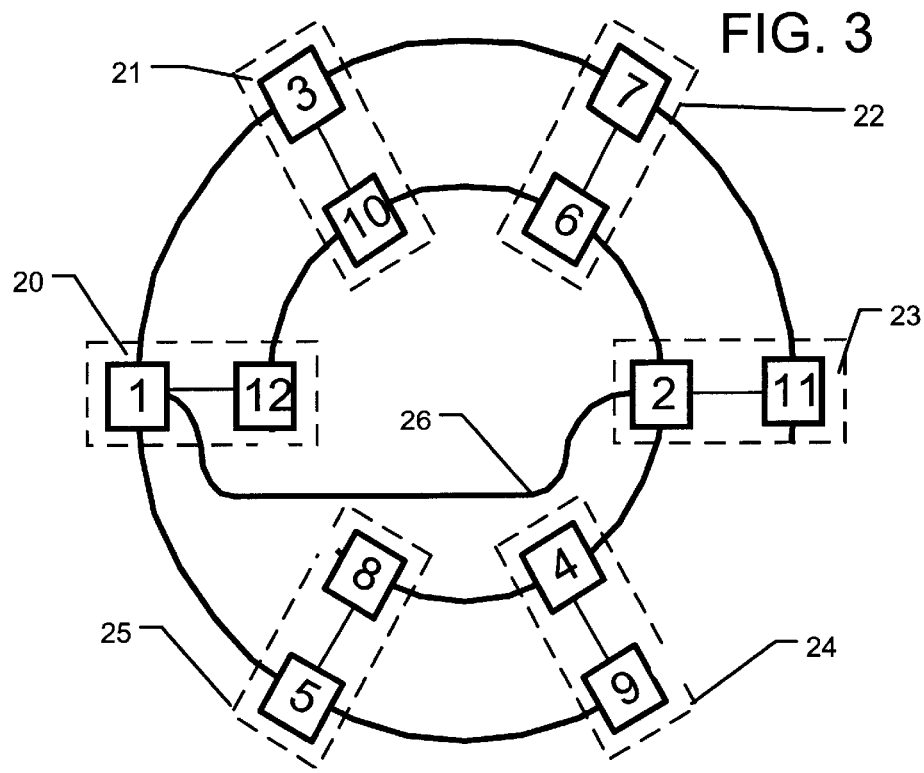
FIG. 3 illustrates a six collocation site, fiber MAN configured as cross-connected broken rings.

FIG. 3 shows one of the ways that six collocation sites and the switches in them can be distributed around these rings according to the cross-connected, broken ring topology. Redundant backup connections between the pair of switches in each collocation site are also shown.

In FIG. 3, a metropolitan area network, which includes six collocation sites 20–25 with link segments arranged in an inner ring and an outer ring, is shown Each collocation site includes two switches for packet-based communications executing a protocol such as gigabit ethernet. Switches 1 and 12 are found in collocation site 20. Switches 3 and 10 are found in collocation site 21. Switches 7 and 6 are found in collocation site 22. Switches 11 and 2 are found collocation site 23. Switches 9 and 4 are found in collocation site 24. Switches 5 and 8 are found in collocation site 25. The switches are configured so that the outer ring is composed of segments between the switches 1 and 3, 3 and 7, 7 and 11, 5 and 1, and 9 and 5. The switches are configured so that the outer ring is broken between switches 9 and 11. The inner ring is composed of segments between switches 2 and 4, 4 and 8, 12 and 10, 10 and 6, and 6 and 2. The switches are configured so that the inner ring is broken between switches 12 and 8. The inner ring is cross-connected with the outer ring by a communication link 26 between switch 2 at the collocation site 23 (at which the inner ring is broken) and switch 1 at the collocation site 20 (at which the outer ring is broken). The communication link 26 is comprised in one embodiment of route diverse fiber also arranged from link segments in the plurality of the rings which traverse physical collocation sites. In an alternative embodiment, the communication link 26 is implemented using other media, such as high bandwidth wireless media.

The cross-connected broken rings are managed according to a spanning tree protocol. For example, switch 1 can be designated the root of the spanning tree, with switches 2, 3 and 5 spaced one link from the root, switches 9, 7, 6 and 4 spaced two links from the root and switches 8, 10 and 11 spaced three links from the root. The two switches in each of the collocation sites are connected together as mentioned before, by an internal link configured in a blocking mode in one embodiment, to provide backup and fail over routes used during re-configuration of the spanning tree in the event of a fault in the network.

Figure 4:
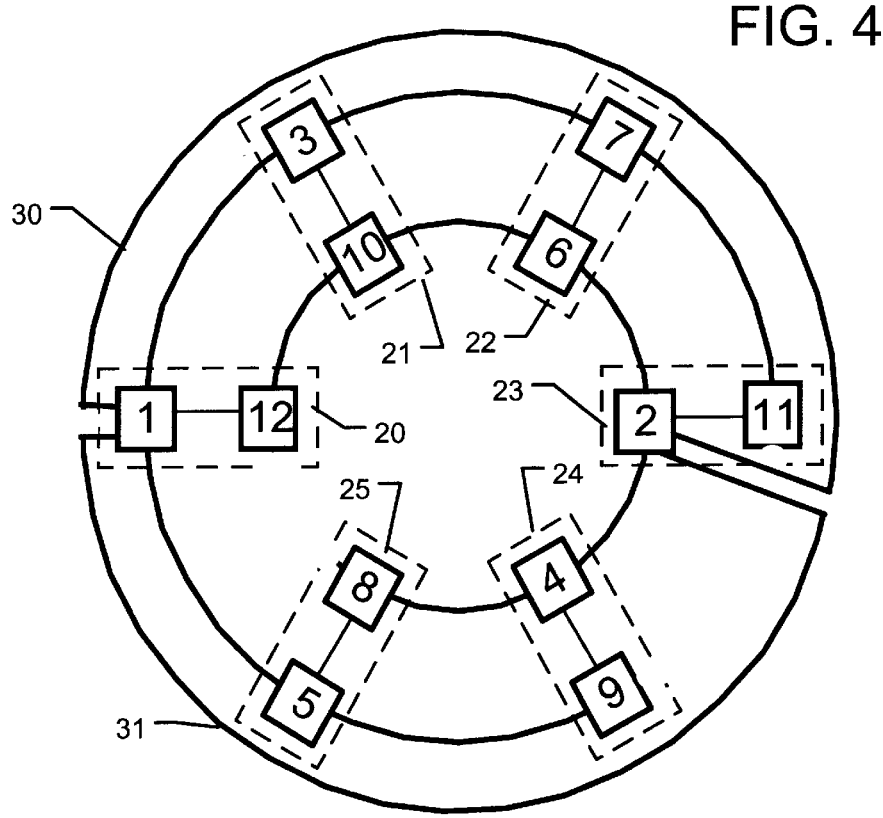
FIG. 4 illustrates an alternative six collocation site, fiber MAN configured as cross-connected broken rings.

The link 26 between the switches 1 and 2 in the topology of FIG. 3, in one embodiment is provided by fiber from the plurality of rings traversing the collocation sites. This could be done with (a) fiber pair(s) clockwise, counterclockwise or both ways around the ring, as indeed could the link(s) between any other pairs of switches. FIG. 4 shows one preferred physical topology for the configuration of FIG. 3, with route diverse connections represented by lines 30 and 31 between switches 1 and 2, and shortest distance connections between the remainder of the switches.

This physical topology design of FIG. 4 provides one example, which is reviewed below to assess reliability and speed of reconfiguration of the topology according to the present invention in the face of failure of switches, individual links, and fiber routes. Switch failures: Failure of any single switch in a collocation site will cause all service interface units SIUs (customer equipment coupled with switches in the collocation sites for access to the metropolitan area network) with root port links to the failing switches to rapidly failover to select another root port attached to a redundant switch. This recovery is provided according to use of an active topology protocol, like the spanning tree, as described in our co-pending U.S. patent application Ser. No. 09/796,842, entitled USE OF ACTIVE TOPOLOGY PROTOCOLS, INCLUDING THE SPANNING TREE, FOR RESILIENT REDUNDANT CONNECTION OF AN EDGE DEVICE, filed on the same day as, and commonly owned with, the present application, and which is incorporated by reference as if fully set forth herein. Further analysis considers the switches that are dependent (in the failure free topology) on the failed switch for connectivity.

Switches 12, 11, 9, and 8 have no dependents.

Failure of switches 10, 7, 5, and 4 will cause their single dependents 12, 11, 9, and 8 to rapidly failover to the established alternate root ports attached by the internal links to switches 1, 2, 4, and 5, respectively.

Spanning tree costs should be set so that if switch 6 fails, switch 10 will rapidly failover to select 3 for its root port and 12 will continue to use 10 for its root port. A possible alternative in which 10 selects 3 but 12 selects 1 would have the undesirable side effect of unnecessarily reducing available bandwidth.

If switch 3 fails, 7 should failover to 6 for its new root port, spanning tree cost considerations being similar as for switch 6:11 should continue to select 7 as its root port.

If switch 2 fails, 4 should failover to 9. Detailed capacity planning can be used to optimize the spanning tree cost allocations. In one example, spanning tree costs are set so that 8 maintains 4 as its root port. However if all the traffic on the 8-4 link has destination access switches other than 4 or 9, the reconfiguration involved in 8 selecting 5 for its root port may be desirable.

Similarly, failure of 2 should lead to 6 selecting 7 for its root port, and maintaining 10 and 12 as dependents.

Failure of switch 1 will cause a more protracted reconfiguration, with switch 2 taking over as the root bridge in the network. This reconfiguration cannot be made rapid, other than by implementation of the full version of Rapid Spanning Tree Protocol (IEEE802.1w/D9).

Link failures: If all the links between a pair of switches fail network recovery is as follows:

Failure of 1-12, 2-11, 3-10, 4-9, 5-8, 6-7 will have no effect if all other links and switches are operational, since these are redundant links. The chance of them failing is also small since they are in-rack or at worst rack to rack cross-connects in the same collocation site.

Failure of 10-12, 7-11, 5-9, and 4-8 results in rapid root port failover for switches 12, 11, 9, and 8 just as for complete failure of the corresponding switches 10, 7, 5, and 4, as described earlier.

Failure of 6-10, 3-7, 2-6, 2-4, 1-5, 1-3, should result in switches 10, 7, 6, 4, 5, and 3 selecting a new root port (to switches 3, 6, 7, 8, and 10 respectively). In the case of 6-10 and 3-7 rapid failover can take place, since an alternate root port is available prior to the reconfiguration. For 2-6, 2-4, 1-5, and 1-3, reconfiguration will be slower since the switch at the other end of the link has to become Designated and transition its port to Forwarding.

Failure of both 1–2 links will lead to significant reconfiguration.

Fiber route failures: A complete cut anywhere in the ring can be analyzed in terms of the above failures. No single cut will cause both 1–2 links to fail.

Reducing the physical topology of the example six collocation site design discussed with reference to FIGS. 3 and 4 to three collocation sites yields configurations such as those described with reference to FIGS. 5–8.

Figure 5:
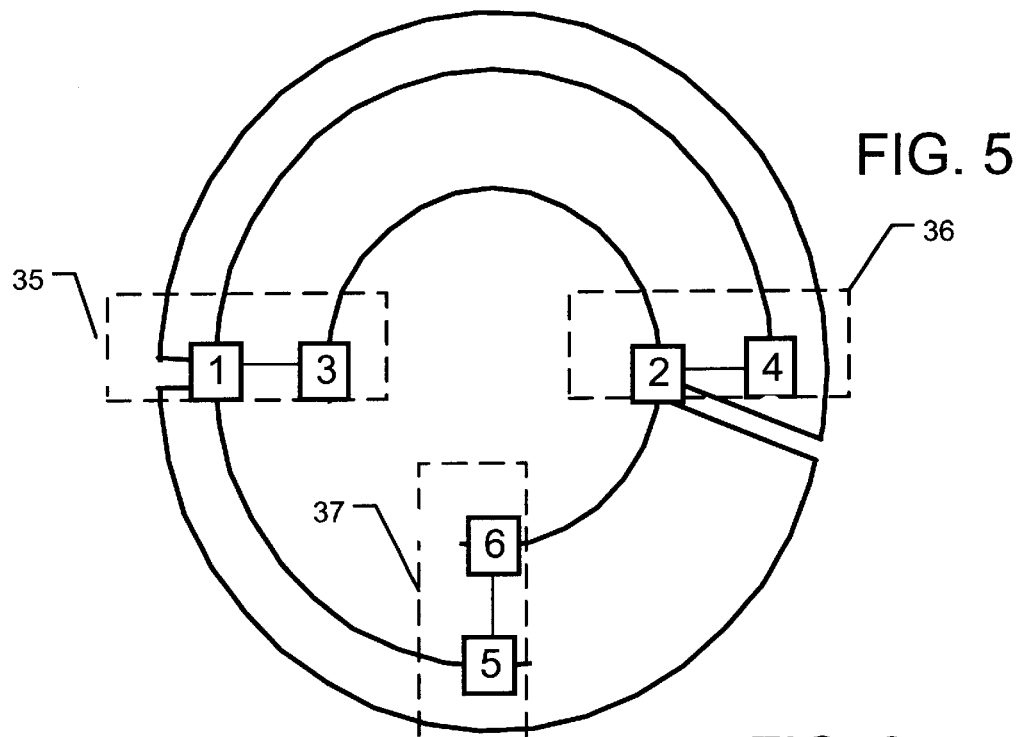
FIG. 5 illustrates a three collocation site, fiber MAN configured as cross-connected broken rings.

In FIG. 5, collocation sites 35, 36 and 37 are traversed by a plurality of rings. The rings in the plurality of rings are partitioned into a plurality of link segments between the switches 1 and 4, and 1 and 5, in an outer ring and between the switches 2 and 3, and 2 and 6, in an inner ring. Redundant links are established between the switches 1 and 2, cross-connecting the inner and outer rings. The outer ring is broken between switches 4 and 5, while the inner ring is broken between switches 3 and 6.

Figure 6:
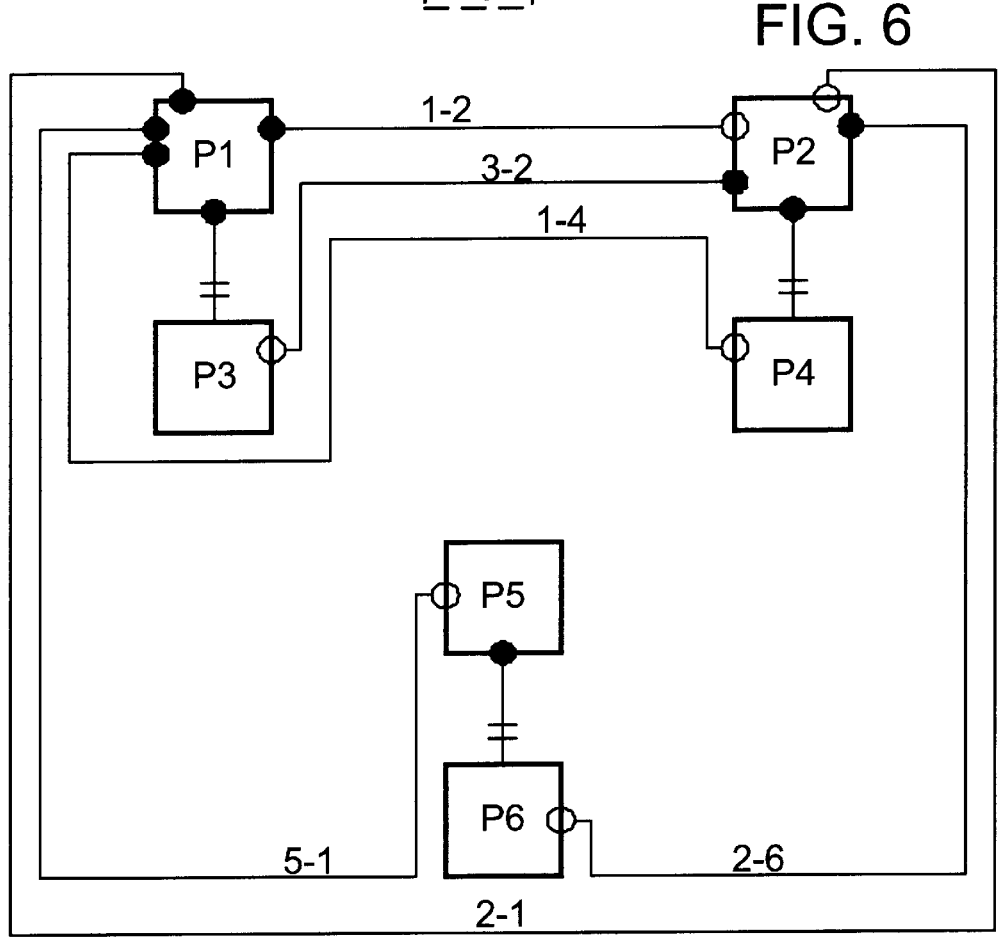
FIG. 6 illustrates a tree topology of a three collocation site, fiber MAN configured as shown in FIG. 5.

FIG. 6 illustrates configuration of the spanning tree for the topology described in FIG. 5. In FIG. 6, the switch P1 corresponds to switch 1 of FIG. 5 at the collocation site 35. The switch P3 corresponds to switch 3, the switch P2 corresponds to the switch 2, and so on. The solid filled circles on the switches correspond to designated ports according to the Spanning Tree Protocol. The unfilled circles on the switches correspond to root ports, and the ports marked by parallel lines crossing the link are alternate ports in a blocking mode. Switch P1 is the root of the tree, and has five designated ports in this example. One of the designated ports on switch P1 is coupled by a link internal to the collocation site to switch P3, which has its corresponding port set in a blocking mode to act as an alternate port. Switch P2 has a root port connected via the link 1-2 to the switch P1. Also switch P2 has a root port connected via the link 2-1 to switch P1. The links 1-2 and 2-1 cross-connect the inner and outer rings. Switch P2 has three designated ports, one of which is coupled to the switch P4 by a link internal to the collocation site, which has its corresponding port set a blocking mode to act as an alternate port. Switch P3 is connected via link 3-2 to the switch P2. Switch P4 is connected via link 1-4 to switch P1. Switch P5 is connected via link 5-1 to switch P1. Switch P6 is coupled via link 2-6 to switch P2. Also, switch P5 has a designated port connected to an internal link to switch P6, which is set in a blocking mode to act as an alternate port.

In a metropolitan area network, the number of transmit and receive pairs which are available for use can be variable. Thus, configuration of the rings traversing the collocation sites involves allocating use of the rings. The following Table 1 provides guidelines for such configurations. In Table 1, the top row indicates the number of transmit and receive pairs which are available around the ring for use in the tree network. Rows in the table are labeled with one of the links of FIG. 6 in the first column, and indicate a number of fibers of the available number of fiber pairs which are allocated for use on that link.

TABLE 1

| Total pairs available around ring | 3 | 4 | 5 | 6 |
|---|---|---|---|---|
| Link 1-2 | 1 | 1 | 1 | 2 |
| Link 1-4 | 1 | 2 | 2 | 2 |
| Link 3-2 | 1 | 1 | 2 | 2 |
| Link 2-1 | 1 | 2 | 3 | 3 |
| Link 5-1 | 2 | 2 | 2 | 3 |
| Link 2-6 | 2 | 2 | 2 | 3 |
| Link 1-3 | 2 | 2 | 2 | 3 |

TABLE 1-continued

| Total pairs available around ring | 3 | 4 | 5 | 6 |
|---|---|---|---|---|
| Link 2-4 | 2 | 2 | 2 | 3 |
| Link 5-6 | 2 | 2 | 2 | 3 |

Figure 7:
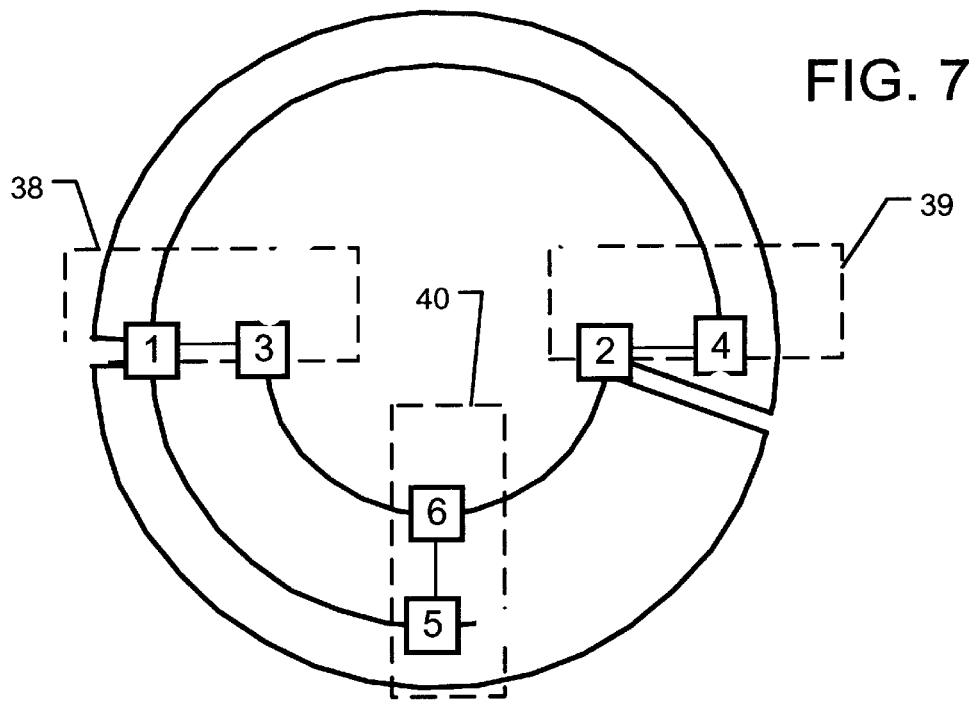
FIG. 7 illustrates an alternative three collocation site, fiber MAN configured as cross-connected broken rings.

FIG. 7 shows an alternative layout of a three collocation site metropolitan area network. Collocation sites 38, 39 and 40 are interconnected by a plurality of fiber rings. Each collocation site includes two switches, which are coupled together by internal links. Collocation site 38 includes switches 1 and 3. Collocation site 39 includes switches 2 and 4. Collocation site 40 includes switches 6 and 5. The rings are partitioned into link segments that are coupled into the switches. The layout of FIG. 7 differs from the layout of FIG. 5, in that that the inner ring is broken between the collocation sites 38 and 39, which correspond to collocation sites 35 and 36 in FIG. 5, rather than between the collocation sites 38 and 40, which correspond to the collocation sites 35 and 37 in FIG. 5. Other alternatives are also available.

Figure 8:
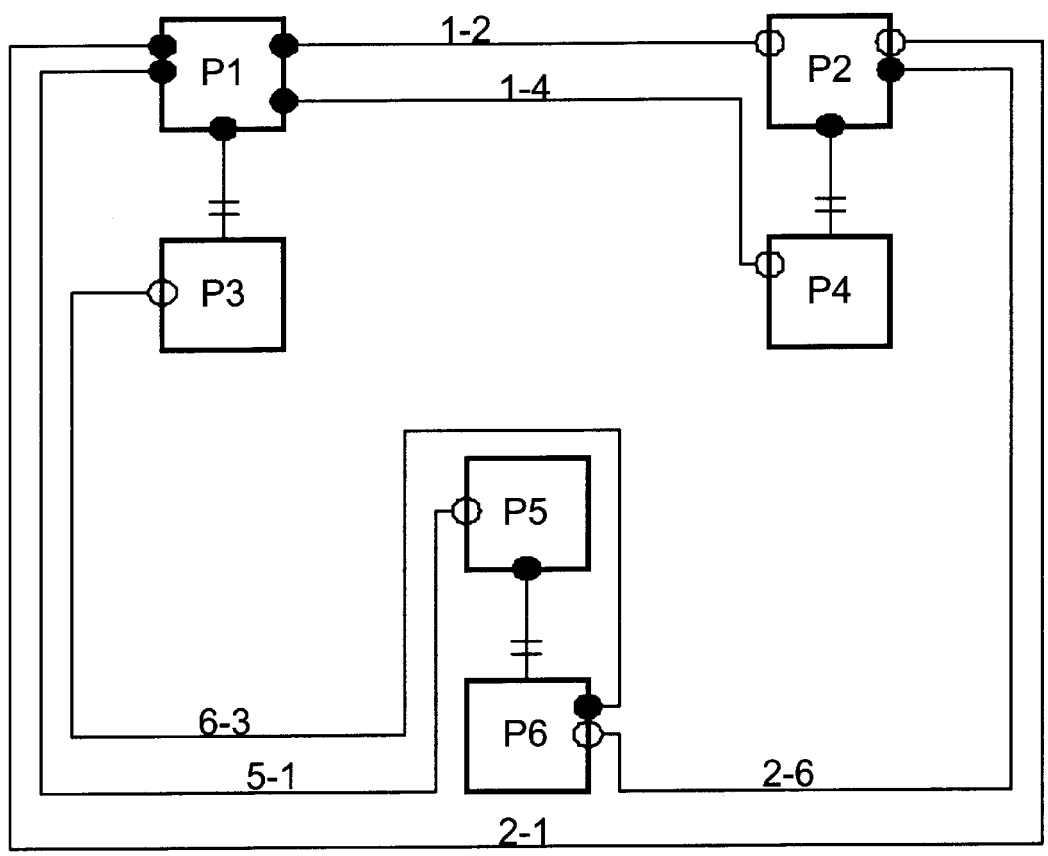
FIG. 8 illustrates a tree topology of a three collocation site, fiber MAN configured as shown in FIG. 7.

FIG. 8 shows configuration of a spanning tree for the topology of FIG. 7. In FIG. 8, the switch P1 corresponds to the switch 1 of FIG. 7, the switch P2 corresponds to the switch in FIG. 7, and so on. The filled circle, unfilled circle, and parallel line markings correspond to the designated port, root port, and alternate port, respectively, using the same conventions as FIG. 6. In this example, the switch P1 is the root of the tree. The switch P1 has five designated ports. One designated port is coupled to an alternate port on switch P3 via an internal link. Another designated port on switch P1 is coupled to a root port on switch P2 via a link 2-1. Another designated port on switch P1 is coupled to a root port on switch P5 via link 5-1. A fourth designated port on switch P1 is coupled to a root port on switch P4 via a link 1-4. A fifth designated port on switch P1 is coupled to a root port on P2 via a link 1-2. A designated port on switch P6 is coupled via a link 6-3 to a root port on switch P3. A designated port on switch P5 is coupled to an alternate port on switch P6 via an internal link. A designated port on switch P2 is coupled to a root port on switch P6 via link 2-6. A designated port on switch P2 is coupled via an internal link to an alternate port on switch P4.

The following Table 2 illustrates allocation of fiber pairs for the topology of FIGS. 7 and 8, according to the number of available fiber rings for use in establishing the cross-connected broken ring topology.

TABLE 2

| Total pairs available around ring | 3 | 4 | 5 | 6 |
|---|---|---|---|---|
| Link 1-2 | 1 | 2 | 1 | 2 |
| Link 1-4 | 2 | 2 | 3 | 4 |
| Link 2-1 | 1 | 1 | 2 | 2 |
| Link 2-6 | 2 | 3 | 3 | 4 |
| Link 5-1 | 1 | 2 | 2 | 2 |
| Link 6-3 | 1 | 1 | 1 | 2 |
| Link 1-3 | 2 | 2 | 2 | 2 |
| Link 2-4 | 2 | 2 | 2 | 4 |
| Link 5-6 | 2 | 2 | 2 | 4 |

The details of a four (or more) collocation site design depend on the placement of switches P1 and P2 at which the broken rings are cross-connected. The choice of the collocation sites to house these two switches may be constrained by other considerations. Assuming that they are in adjacent facilities, we have the layout of FIG. 9, with an initial spanning tree configuration as shown in FIG. 10.

Figure 9:
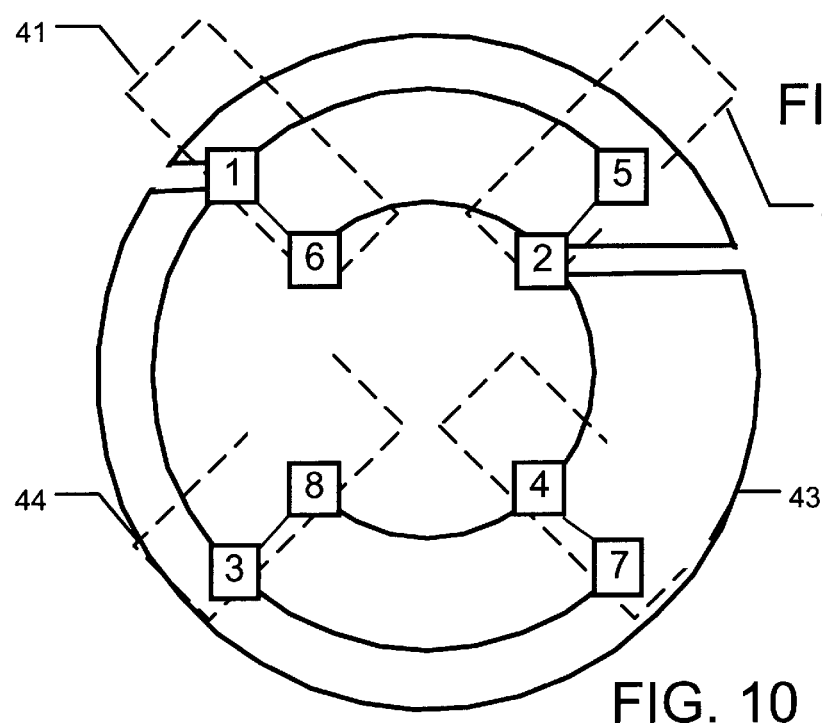
FIG. 9 illustrates a four collocation site, fiber MAN configured as cross-connected broken rings.

In FIG. 9, collocation site 41 houses switches 1 and 6, collocation site 42 houses switches 5 and 2, collocation site 43 houses switches 7 and 4, and collocation site 44 houses switches 3 and 8. The broken rings are cross-connected between switches 1 and 2, as in the other examples. The collocation sites 41 and 42 are adjacent one another in the ring, in that there are no intervening collocation sites in one direction around ring.

Figure 10:
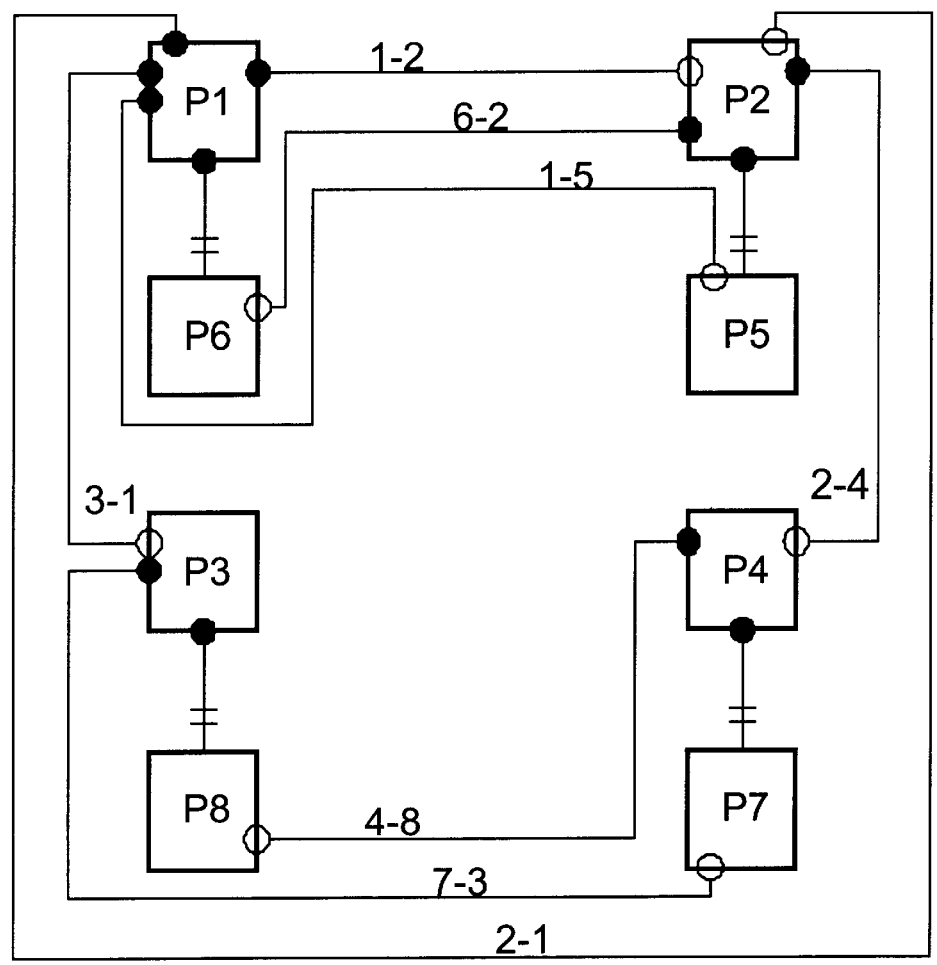
FIG. 10 illustrates tree topology of a four collocation site, fiber MAN configured as shown in FIG. 9.

FIG. 10 shows the spanning tree layout for the topology of FIG. 9, using the same drawing conventions as in FIGS. 6 and 8. The root of the tree is switch P1. Switch P1 has designated ports coupled via links 1-2 and 2-1 to redundant root ports on switch P2. Switch P1 has a designated port coupled via link 1-5 to the root port on switch P5. Switch P1 has a designated port coupled via link 3-1 to the root port on switch P3. Finally, switch P1 has a designated port coupled via an internal link to an alternate port on switch P6. Switch P2 has a designated port coupled via link 6-2 to a root port on switch P6, a designated port coupled via the link 2-4 to a root port on switch P4, and a designated port coupled via an internal link to an alternate port on switch P5. Switch P3 has designated port coupled via link 7-3 to a root port on switch P7. Also, switch P3 has a designated port coupled via an internal link to an alternate port on switch P8. Switch P4 has a designated port coupled via link 4-8 to a root port on switch P8 and a designated port coupled via an internal link to an alternate port on switch P7.

The following Table 3 shows an initial configuration for allocation of the fiber rings for the layout of FIGS. 9 and 10 is as follows.

TABLE 3

| Total pairs available around ring | 2 N/A | 3 | 4 | 5 | 6 |
|---|---|---|---|---|---|
| Link 1-2 | | 1 | 1 | 1 | 2 |
| Link 6-2 | | 1 | 2 | 2 | 2 |
| Link 1-5 | | 1 | 1 | 2 | 2 |
| Link 2-1 | | 1 | 2 | 3 | 2 |
| Link 2-6 | | 2 | 2 | 2 | 4 |
| Link 4-8 | | 1 | 1 | 1 | 2 |
| Link 7-3 | | 1 | 1 | 1 | 2 |
| Link 3-1 | | 2 | 2 | 2 | 4 |
| Link 1-6 | | 2 | 2 | 2 | 2 |
| Link 2-5 | | 2 | 2 | 2 | 2 |
| Link 3-8 | | 2 | 2 | 2 | 2 |
| Link 4-7 | | 2 | 2 | 2 | 2 |

Figure 11:
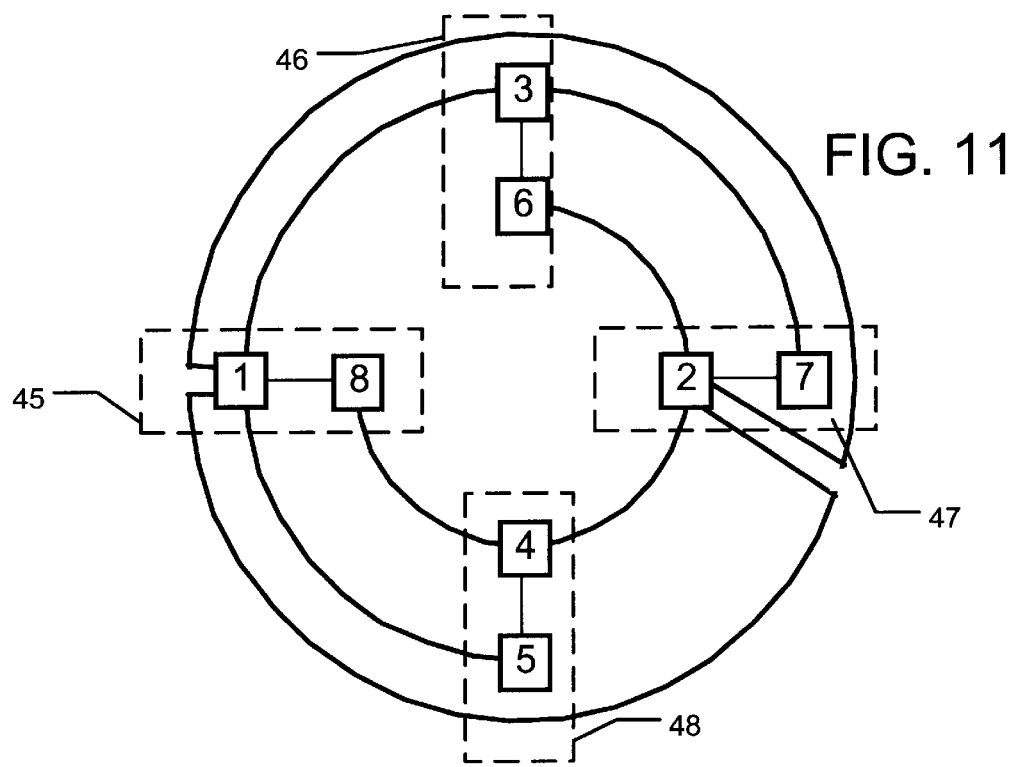
FIG. 11 illustrates an alternative four collocation site, fiber MAN configured as cross-connected broken rings.
Figure 12:
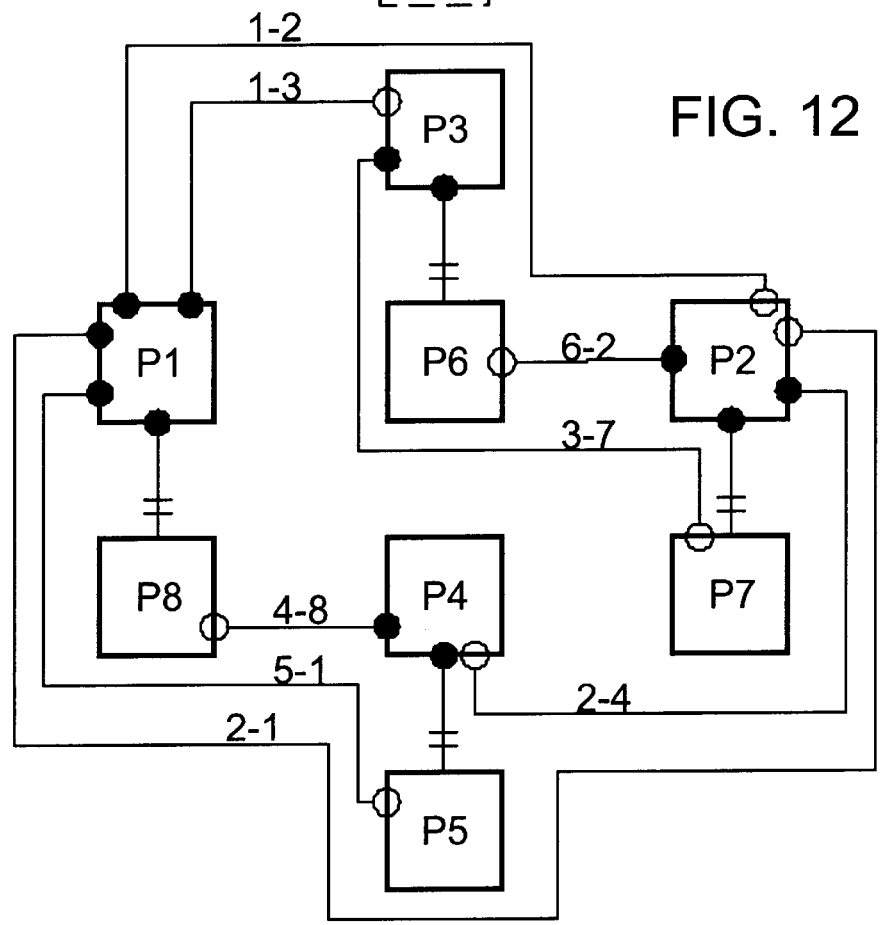
FIG. 12 illustrates tree topology of a four collocation site, fiber MAN configured as shown in FIG. 11.

If P1 and P2 are not in adjacent collocation sites, a topology such as shown in FIGS. 11 and 12 may be used. As can be seen in FIG. 11, collocation site 45 houses switches 1 and 8, collocation site 46 houses switches 3 and 6, collocation site 47 houses switches 2 and 7, and collocation site 48 houses switches 4 and 5. The switches 2 and 1 at which the broken rings are cross-connected are not an adjacent collocation sites in either direction around ring.

FIG. 12 shows a spanning tree configuration for the layout of FIG. 11. Again, the root of the tree is switch P1. Switch P1 has designated ports coupled via links 1-2, 2-1, 1-3, and 5-1, to root ports on switches P2, P2, P3, and P5, respectively. Also, it includes a designated port coupled via an internal link to an alternate port on switch P8. Switch P2 has designated ports coupled to root ports via links 6-2 and 2-4 on switches P6 and P4, respectively. Also, a designated port on switch P2 is coupled to an alternate port on switch P7. Switch P3 has a designated port coupled via link 3-7 to a root port on switch P7. Also, a designated port on switch P3 is coupled via an internal link to an alternate port on switch P6. A designated port on switch P4 is coupled via link 4-8 to a root port on switch P8. Also a designated port on switch P4 is coupled via an internal link to an alternate port on switch P5.

The following Table 4 shows an initial configuration which may be used for allocation of the fiber rings for the layout of FIGS. 11 and 12.

TABLE 4

| Total pairs available around ring | 2 N/A | 3 | 4 | 5 | 6 |
|---|---|---|---|---|---|
| Link 1-2 | | 1 | 2 | 2 | 2 |
| Link 1-3 | | 2 | 2 | 3 | 4 |
| Link 3-7 | | 1 | 1 | 2 | 2 |
| Link 6-2 | | 1 | 1 | 1 | 2 |
| Link 2-1 | | 1 | 2 | 2 | 2 |
| Link 2-4 | | 2 | 2 | 3 | 4 |
| Link 4-8 | | 1 | 1 | 1 | 2 |
| Link 5-1 | | 1 | 1 | 2 | 2 |
| Link 1-8 | | 2 | 2 | 2 | 2 |
| Link 2-7 | | 2 | 2 | 2 | 2 |
| Link 3-6 | | 2 | 2 | 2 | 2 |
| Link 4-5 | | 2 | 2 | 2 | 2 |

Figure 13:
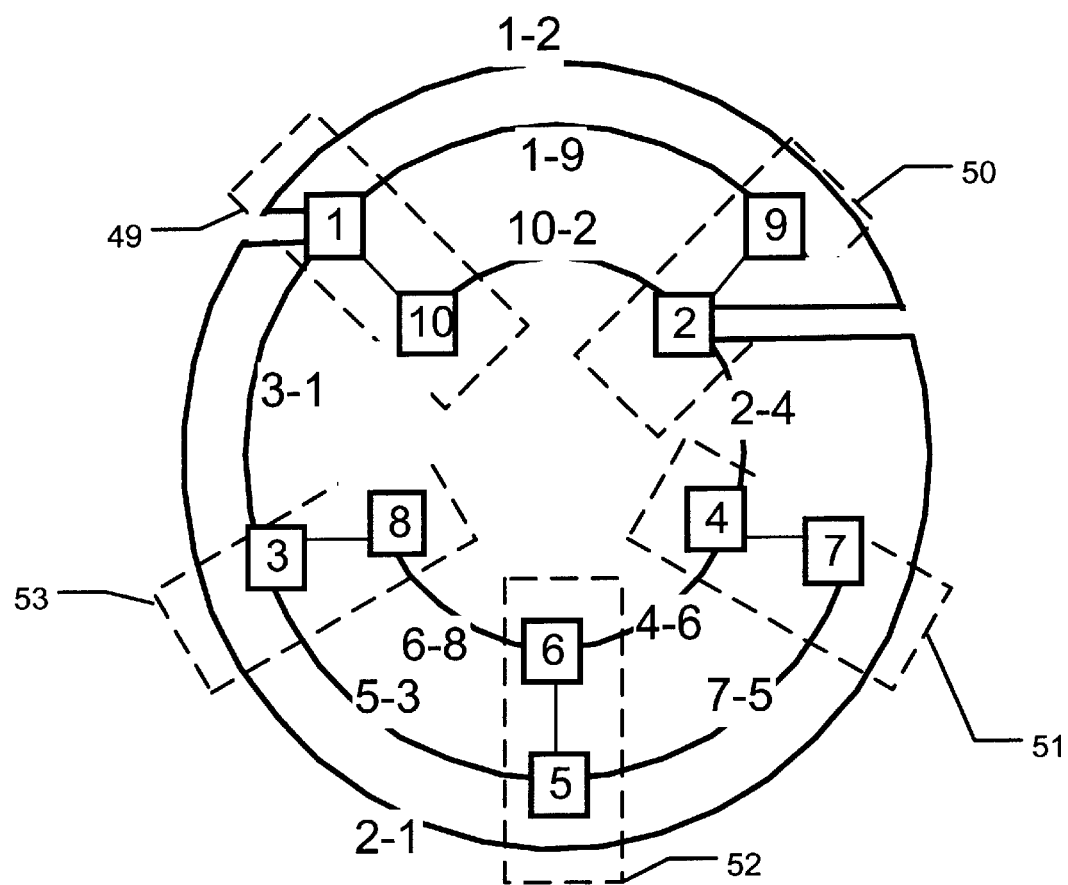
FIG. 13 illustrates a five collocation site, fiber MAN configured as cross-connected broken rings.

FIG. 13 shows a five collocation site design with P1 and P2, at which the broken rings are cross-connected, in adjacent facilities, although a design that places them in non-adjacent collocation sites is possible, just as for the alternate four collocation site design above, and indeed may be more desirable from the point of view of minimizing the bridge diameter of the network.

In the layout of FIG. 13, collocation sites 49–53 are distributed in a metropolitan area and traversed by a plurality of fiber rings. Collocation site 49 houses switches 1 and 10. Collocation site 50 houses switches 9 and 2. Collocation site 51 houses switches 7 and 4. Collocation site 52 houses switches 5 and 6. Collocation site 53 houses switches 3 and 8. The inner ring includes link 10-2 between switches 10 and 2, link 2-4 between switches 2 and 4, link 4-6 between switches 4 and 6, and link 6-8 between switches 6 and 8. The inner ring is broken between switches 8 and 10. The outer ring includes link 1-9 between switches 1 and 9, link 3-1 between switches 3 and 1, link 5-3 between switches 5 and 3, and link 7-5 between switches 7 and 5. The outer ring is broken between switches 9 and 7. The inner ring and the outer ring are cross-connected by redundant connections via link 1-2 between switches 1 and 2, and via link 2-1 between switches 1 and 2.

Table 5 shows an initial allocation of fiber pairs, labeling the links by proceeding clockwise around the ring as with prior examples.

TABLE 5

| Total pairs available around ring | 2 N/A | 3 | 4 | 5 | 6 |
|---|---|---|---|---|---|
| Link 1-2 | | 1 | 1 | 1 | 2 |
| Link 1-9 | | 1 | 2 | 2 | 2 |
| Link 10-2 | | 1 | 1 | 2 | 2 |
| Link 2-1 | | 1 | 2 | 2 | 2 |
| Link 2-4 | | 2 | 2 | 3 | 4 |

TABLE 5-continued

| Total pairs available around ring | 2 N/A | 3 | 4 | 5 | 6 |
|---|---|---|---|---|---|
| Link 4-6 | | 1 | 1 | 2 | 2 |
| Link 7-5 | | 1 | 1 | 1 | 2 |
| Link 5-3 | | 1 | 1 | 2 | 2 |
| Link 6-8 | | 1 | 1 | 1 | 2 |
| Link 3-1 | | 2 | 2 | 3 | 4 |
| Link 1-10 | | 2 | 2 | 2 | 2 |
| Link 2-9 | | 2 | 2 | 2 | 2 |
| Link 3-8 | | 2 | 2 | 2 | 2 |
| Link 4-7 | | 2 | 2 | 2 | 2 |
| Link 5-6 | | 2 | 2 | 2 | 2 |

Figure 14:
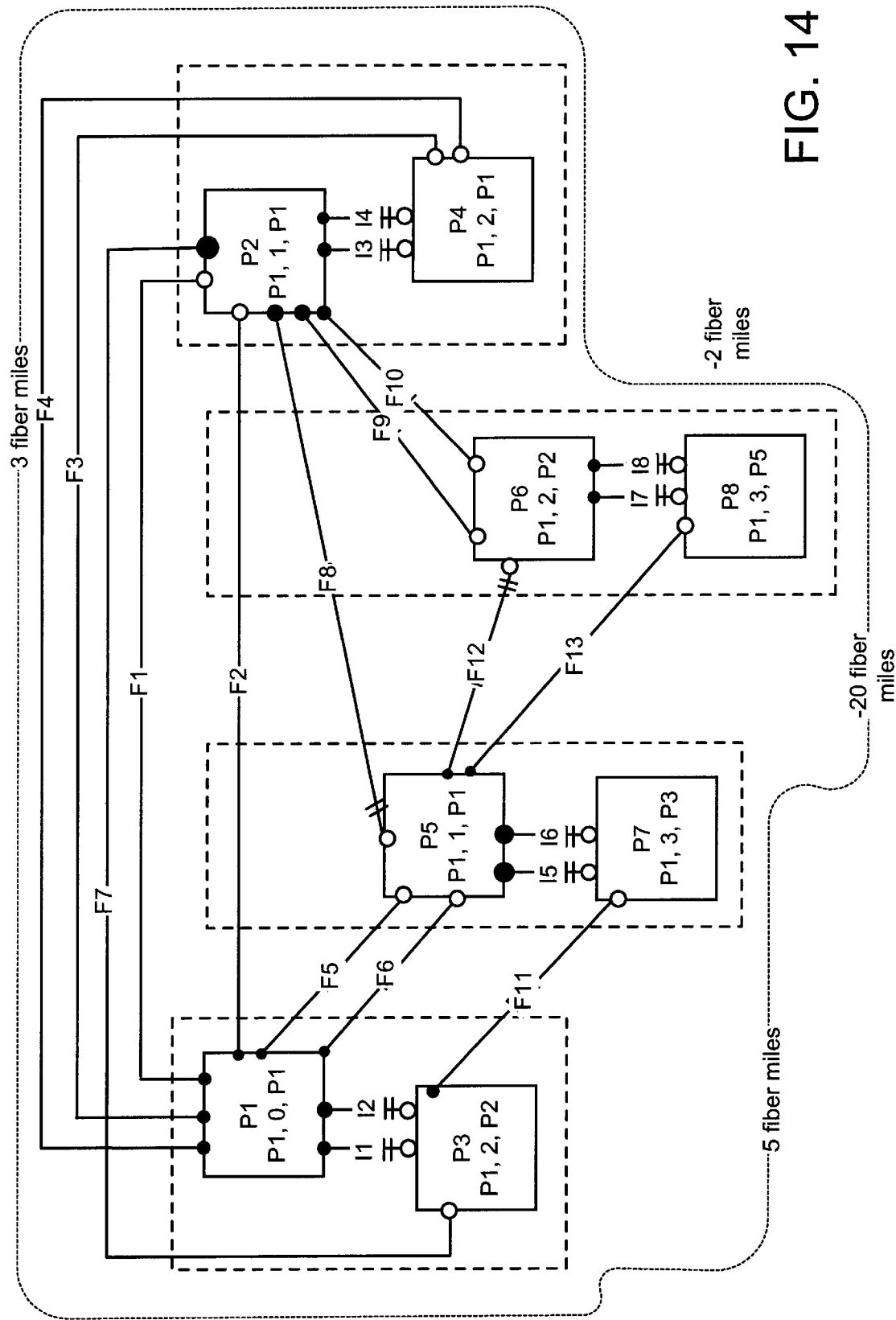
FIG. 14 illustrates a fiber MAN network physically laid out as a ring, and partitioned as segments of the secure MAN of the present invention.

FIG. 14 illustrates a fiber ring network extending around a path of about 20 miles, which is made of bundles of fibers laid in right of ways within a metropolitan area. Segments of the ring are logically partitioned as segments of an ethernet network, configured as a tree, rather than a ring, illustrating a layout according to the present invention other than the cross-connected broken ring. Switches in the tree comprise standard 100 Megabit, Gigabit or higher ethernet switches configured according to the Spanning Tree Protocol, or variations of the Spanning Tree Protocol.

In FIG. 14, switch P1 is a root of the tree, labeled P1, 0, P1 to indicate that the root of the tree is P1, the distance to the root is 0, and the upstream (toward the root) switch is P1. The interconnection of the tree can be understood by the upstream links for the switches. Thus there are no upstream links from switch P1. Switch P2 (P1,1,P1) is connected by fibers F1 and F2 to switch P1. Switch P3 (P1,2,P2) is connected by fiber F7 to switch P2. Fibers I1 and I2 are configured as backup links to switch P1 from switch P3. Switch P4 is connected by fibers F3 and F4 to switch P1. Fibers I3 and I4 are connected as backup links to switch P2 from switch P4. Switch P5 is connected by fibers F5 and F6 to switch P1. Fiber F8 is connected as a backup link from switch P5 to switch P2. Switch P6 is connected by fibers F9 and F10 to switch P2. Fiber F12 is a backup link from switch P6 to switch P5. Switch P7 is connected by fiber F11 to switch P3. Fibers I5 and I6 act as backup links to switch P5 from switch P7. Switch P8 is connected by fiber F13 to switch P5. Fibers I7 and I8 are connected as backup links from switch P8 to switch P6.

The fibers F1 to F13 and I1 to I8 comprise dark fibers in the fiber ring, which have been partitioned as point to point fiber segments in the tree as shown. Thus, fiber of a single ring can be re-used spatially. That is segments of a single ring can be used independently for point-to-point links in the tree.

Customers of the secure network are connected to the switches in a variety of access configurations, examples of which are described below. In order to use the secure MAN transmission services of the network of FIG. 14, Access Service and virtual connection service are required.

Figure 15:
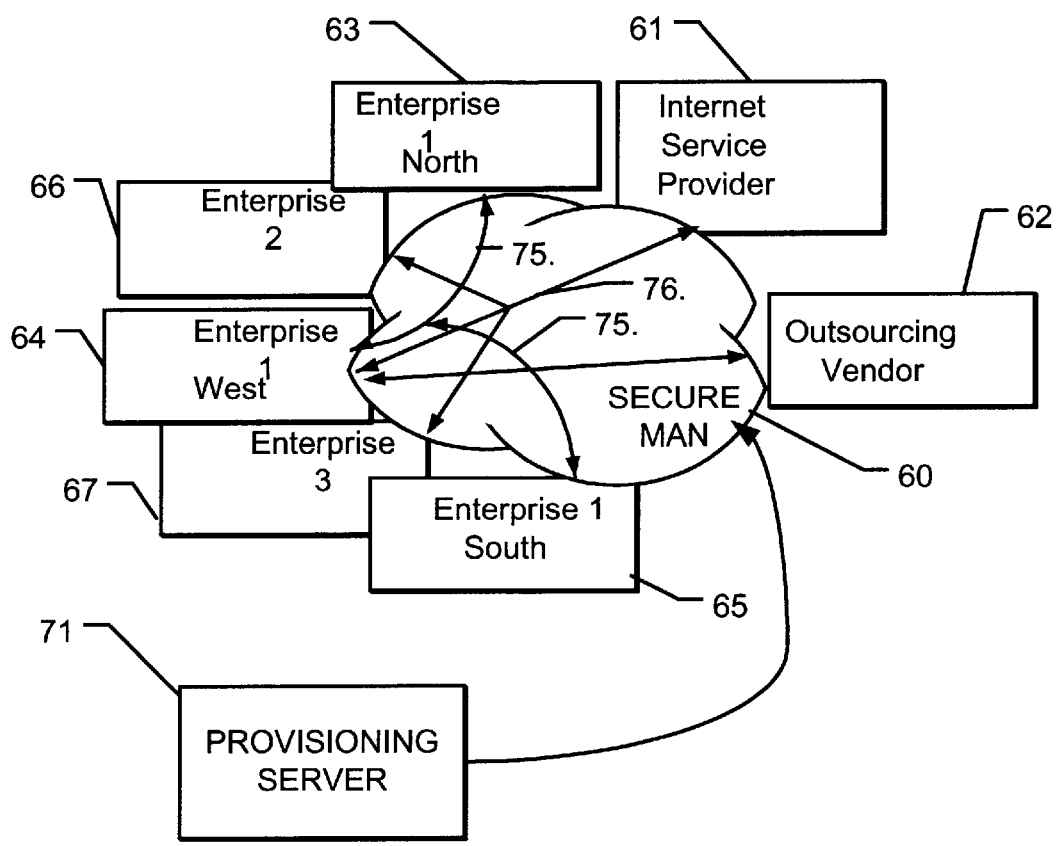
FIG. 15 is a diagram of a commercial communication service with an Internet based provisioning server according to the present invention.

FIG. 15 illustrates a communications service example, based on provisioning links among a variety of customers within a secure metropolitan area network MAN. In FIG. 15, a secure MAN based upon cross-connected, broken rings is represented by cloud 60. A number of customers, including Internet service provider 61, outsourcing vendor 62, "enterprise 1" with a North campus 63, a West campus 24, and a South campus 25, and "enterprise" 2 66 and enterprise 3 67, are coupled to the secure MAN 60 by appropriate physical and logical interfaces. A provisioning server 71 is coupled to the secure MAN 60, either using the secure MAN medium or by other communication channels to the switches and other resources in the secure MAN, and facilitates transactions among the customers of the secure MAN 60 for establishing communication channels, such as the virtual connections discussed above, and provisioning of services agreed to by the customers with the resources of the secure MAN 60. In one embodiment, configuring and allocating of services within the secure MAN 60 to support the links among the customers, is managed by the provisioning server using a management protocol such as Telnet or SNMP, under which filters and other control data structures in the switches are configured. In this manner, the provisioning server is available via the internet to customers and potential customers of the secure MAN 60, using standard technology.

Virtual connection services allow rich connectivity among all customer locations on the secure MAN network. Examples include:

A mesh connected, multipoint-to-multipoint virtual connection service 35 dedicated to a single enterprise for connecting campuses together.

A point-to-multipoint virtual connection service 76 connecting an Internet Service Provider to customers.

A point-to-point virtual connection service 77 connecting an enterprise location to an outsourcing vendor.

A point-to-point virtual connection service 78 connecting two enterprises.

A single customer can have simultaneous intra-enterprise and extra-enterprise communications using the secure MAN, provisioned according to the present invention.

A detailed description of one example of the secure MAN provisioning embodiment is provided in the above referenced application entitled, E-COMMERCE SYSTEM FACILITATING SERVICE NETWORKS INCLUDING BROADBAND COMMUNICATION SERVICE NETWORKS, which is incorporated by reference as if fully set forth herein.

Figure 16:
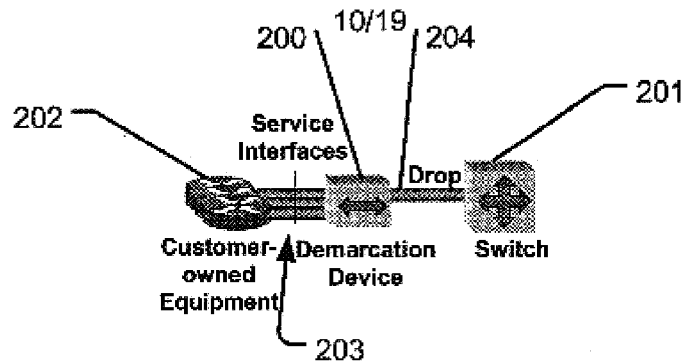
FIG. 16 illustrates a generic access connection to a secure MAN according to the present invention.

Access service is used for connecting to the secure MAN network. It provides a physical connection between customer-owned equipment and a secure MAN switch such as one of switches in the topologies described above in connection with FIGS. 3–14. The generic Access Service is depicted in FIG. 16, including a demarcation device 200, a secure network switch 201 and customer-owned equipment 202.

A demarcation device 200 is always situated between customer-owned equipment and a secure MAN switch. The demarcation device 200 connects to customer-owned equipment 202 through one or more service interfaces 203. The demarcation device 200 converts between the physical layer of the drop 204 and that of the service interfaces 203. The demarcation device 200 also performs surveillance and maintenance functions.

The drop 204 will typically use a fiber optic link with at least 1 Gbps bandwidth although other transmission technologies may be used, e.g., high bandwidth wireless transmission. The type of transmission used is transparent to the customer.

The service interface 203 is the point at which customer-owned equipment 202, typically an internet protocol IP or multiprotocol router, is attached. This interface 203 runs IP over 10/100/1000 Mbps Ethernet for example, using either a copper or fiber physical layer. An auto-sensing 10/100 Ethernet service interface may also be used. Also, other higher speed Ethernet technologies could be used.

In the secure MAN, 'demarcation devices' situated on individual customer's premises can provide for redundant connections to the rest of the network. Selection of one link in preference to another can be achieved by use of the spanning tree or a similar protocol. However, only traffic that is transmitted by or destined for a given customer is allowed to reach that customer's demarcation device (a packet switch). It is not desirable that a demarcation device act as a transit link in the network, ensuring full connectivity from one part of the network to another, either during a reconfiguration of the network or while the active topology is stable. Rather the network should partition if there is no other connectivity between the two halves.

In the past, the simple selection of one link or another for connection to the interior of a network has been performed by a simple physical layer redundancy scheme that interrogates the health of the links from a demarcation device switch to the network. One link is configured as a primary link and the secondary link is activated only if the primary fails a simple connectivity test to the remainder of the network, e.g. loss of the transmitted light signal.

One embodiment of the secure MAN improves on this prior arrangement, while not allowing the demarcation device to participate in the active topology of the network, by choosing the active link from the demarcation device to the network on the basis of the spanning tree information received by the device, but not allowing it to forward or generate spanning tree information. This arrangement protects against a failure in the network that causes the switch connected to by the demarcation device to be separated from the main body of the network.

Figure 17:
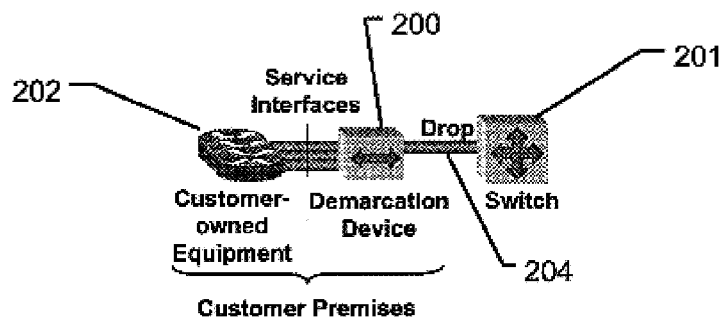
FIG. 17 illustrates a basic single tenant access arrangement.
Figure 27:
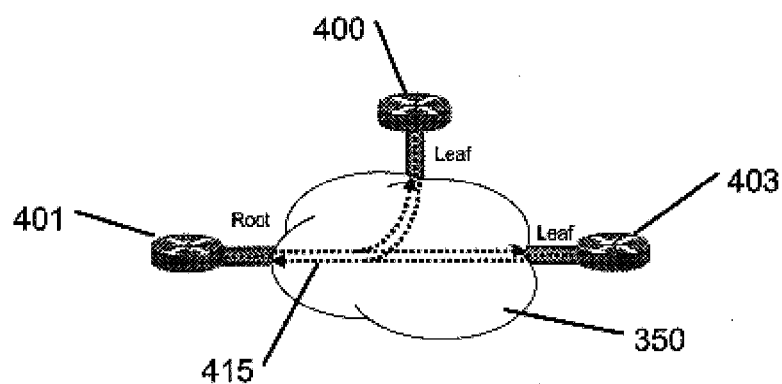
FIG. 27 illustrates a point-to-multipoint virtual connection service for a secure MAN network according to the present invention.

There are several alternative access arrangements possible, examples of which are shown in FIGS. 17–24. FIG. 17 shows a basic single tenant access arrangement. In this case, the customer-owned equipment 202 is located in a building solely occupied and controlled by the customer. The demarcation device 200 is also located within the customer premises as shown in FIG. 27. The demarcation device 200 is dedicated to the customer. The single tenant customer has several options for the use of multiple drops to improve service availability.

Figure 18:
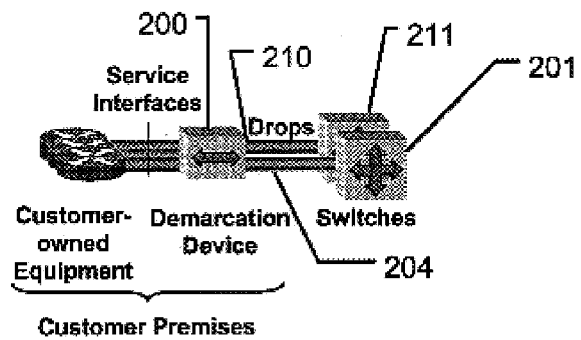
FIG. 18 illustrates a redundant switch access service with parallel drops.

One option involves use of a Redundant Switch Access Service as shown in FIG. 18, in which a second drop 210 is connected from the demarcation device 200 to a different secure MAN Switch 211. This is done to maximize diversity. A failure of a drop, the switch, or the switch port will result in data flowing over the drop to be rerouted over the redundant drop in a very short time, e.g., less than 50 ms.

In Redundant Switch Single Tenant Access Service, the drops will typically reside within the same physical path from the customer premises to the first splice point at which point they will follow diverse physical paths.

Figure 19:
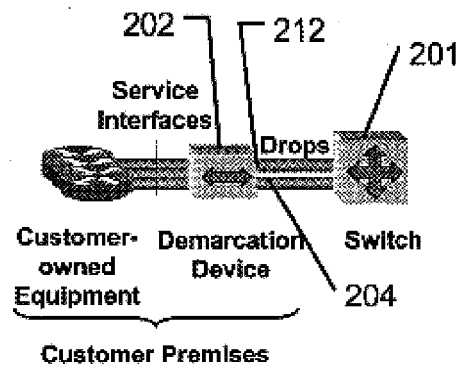
FIG. 19 illustrates a parallel single tenant access service with two drops coupled to a single access switch.

Parallel Single Tenant Access Service is another alternative, as shown in FIG. 19. In this case, drops 204 and 212 terminate on the same secure MAN switch 201. Unlike Redundant Single Tenant Access Service, the multiple drops 204, 212 can be used for load sharing in that data can flow over the drops simultaneously. In the event of a failure of a drop or the switch port, data flowing over the drop will be rerouted to the other drop in a very short time, e.g., less than 50 ms. In Parallel Single Tenant Access Service, the drops will typically reside within the same physical path from the customer premises to the point-of-presence of the first secure MAN switch.

Figure 20:
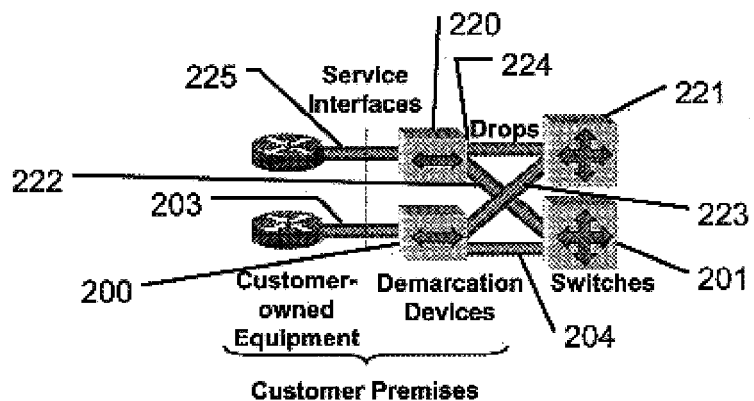
FIG. 20 illustrates a fully redundant single tenant access service according to one aspect of the invention.

Ather access service option is Fully Redundant Single Tenant Access Service as illustrated in FIG. 20, including redundant demarcation devices 200, 220 and redundant switches 204, 221 with redundant drops 204, 222, 223, 224 for each demarcation device-access switch pair. Fully Redundant Single Tenant Access Service protects against the same failures that Redundant Switch Single Tenant Access Service does and in addition protects against failure of a demarcation device and the failure of the customer-owned equipment attached to a service interface. Both service interfaces 203, 225 are activated for customer use but the ability to simultaneously use them will depend on the details of the routing protocol being used by the customer. Similarly the ability of the customer-owned equipment to detect a failure and start using a service interface on the other demarcation device will depend on the details of the routing protocol being used by the customer.

In Fully Redundant Single Tenant Access Service, the drops will typically reside within the same fiber optic cable from the customer premises to the first splice point at which point they will follow diverse physical paths.

Figure 21:
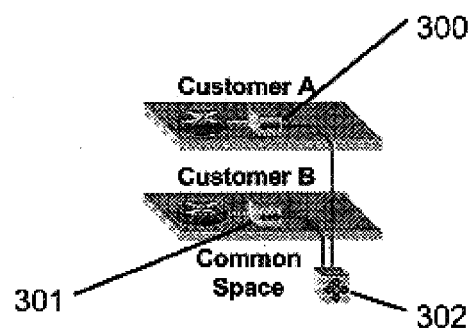
FIG. 21 illustrates a multi-tenant access arrangement for use with the secure MAN of the present invention.

In other situations Multi-Tenant Access is used as shown in FIG. 21. In this case, there is a single building or campus with multiple customers. Some secure MAN Equipment will be in space not controlled by the customer. For example, the equipment could be in space leased from the landlord. In this example, the demarcation devices 300, 301 reside within the space of the customers, and are coupled to switch 302 which may or may not be located at the customer premises.

Figure 22:
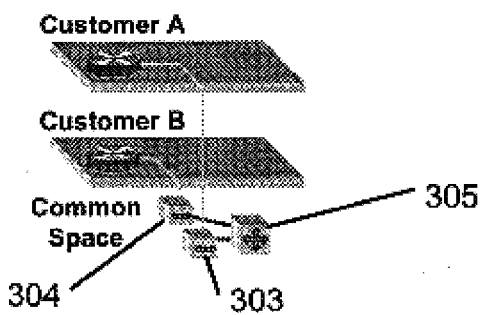
FIG. 22 illustrates another example multi-tenant access arrangement.

Another example is shown in FIG. 22, in which the demarcation devices 303, 304 are centrally located, and coupled to access switch 305 which may or may not be located at the customer premises.

In both of the above examples, each demarcation device is dedicated to a single customer. In addition, the secure MAN Services that a customer sees across the service interface is the same no matter which configuration is used.

There are other possibilities including a mix of centralized and distributed demarcation devices. It may also be possible and/or desirable to share a demarcation device among more than one customer.

Figure 23:
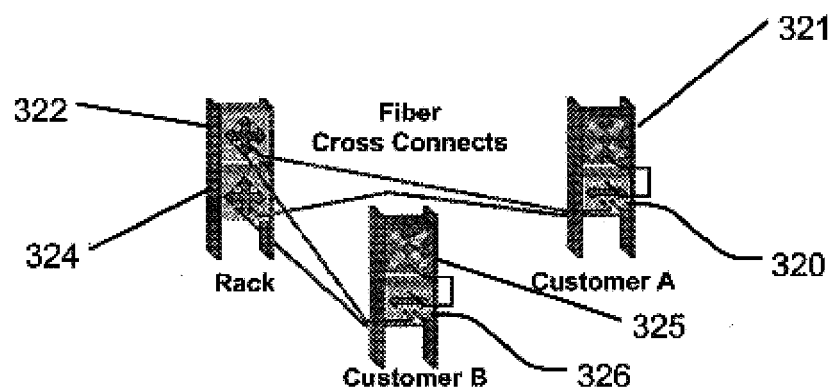
FIG. 23 illustrates a collocation facility access arrangement for connection to the secure MAN of the present mention.
Figure 24:
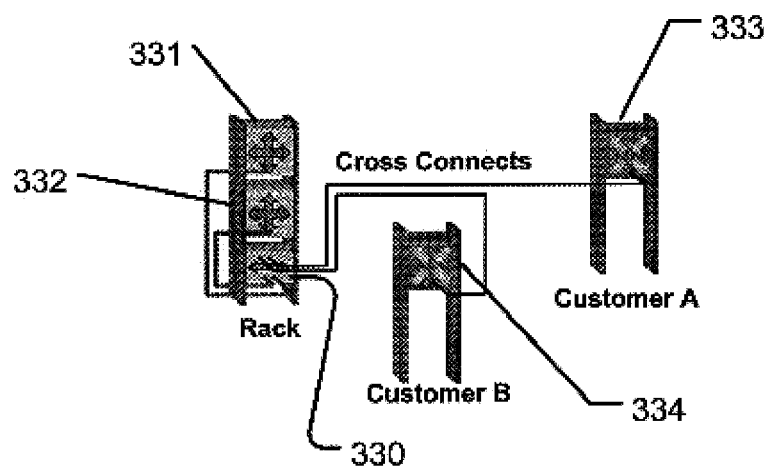
FIG. 24 illustrates another example collocation facility access arrangement.

In another situation collocation facility access is used as shown in FIGS. 22 and 24. In some ways Collocation Facility Access is like multi-tenant access. However, the secure MAN service provider will have leased space in the facility in which the customer demarcation device is placed. The preferred configuration for a collocation facility is shown in FIG. 23. The demarcation device 320 is in the customer's rack 321 and dual connected back to different switches 322, 323 located in a secure MAN rack 324 at a collocation site. These connections are effected by Gigabit Ethernet multi-mode fiber cross-connects. The customer-owned equipment connects to the demarcation device with the appropriate Ethernet cable. Additional customers may use the same collocation facility, as shown by demarcation device 326 in rack 325.

In some cases, the customer may not want to accommodate the demarcation device in his or her rack space. In this case, the configuration is that shown in FIG. 24. The demarcation device 330 is in the secure MAN rack and is dual connected to the two switches 331, 332 in the rack. The customer-owned equipment 333, 334 is connected to the demarcation device 330 via an appropriate Ethernet cross-connect. In large collocation facilities, this cross-connect will typically be multimode fiber. A demarcation device 330 can be used for supporting multiple customers.

Once customers have established connections to the secure MAN network, links among them are established using the provisioning system referenced above. Links in this example embodiment are referred to as virtual connections.

Virtual connection service provides the transfer of data between multiple service interfaces. Three kinds of virtual connection services in this example, include point-to-point, point-to-multipoint, and multipoint-to-multipoint.

In point-to-point virtual connections, an internet protocol IP packet delivered across a service interface is delivered to exactly one other service interface. Of course, in addition to IP, other higher layer protocols may be utilized for virtual connections of all types. This service is like a physical wire.

Figure 25:
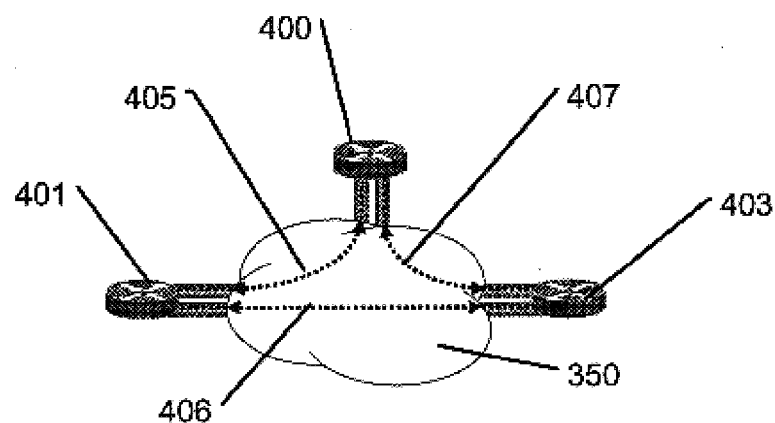
FIG. 25 illustrates an example of the use of point-to-point virtual connection services according to the present invention.

FIG. 25 shows an example of the use of point-to-point virtual connection services within the secure MAN network 350. For a point-to-point virtual connection, a service interface for customer equipment 400 is connected by link 405 to a service interface for customer equipment 401; a service interface for customer equipment 401 is connected by a link 406 to a service interface for customer equipment 402; and a service interface for customer equipment 402 is connected by a link 407 to a service interface for customer equipment 400.

In multipoint-to-multipoint virtual connections, multiple service interfaces are interconnected. A customer-owned equipment device attached to one of these interfaces can send IP packets to any of the other interfaces that have been assigned to the virtual connection service. This service is similar to Frame Relay where multiple destinations, each specified by a DLCI value, can be reached via a single physical interface.

Figure 26:
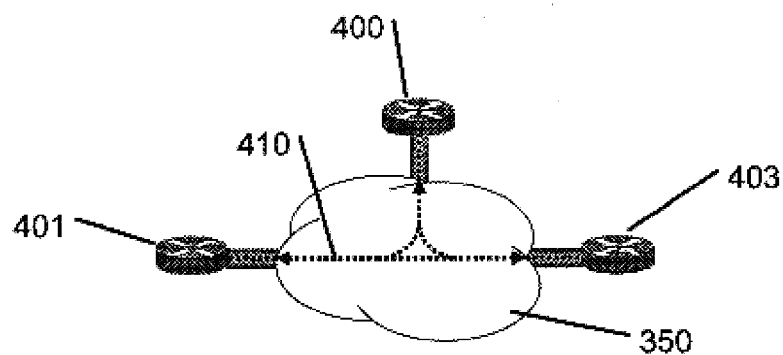
FIG. 26 shows an example of a multipoint-to-multipoint virtual connection service.

FIG. 26 shows an example of the use of a multipoint-to-multipoint virtual connection service. In FIG. 26, a service interface for customer equipment 400, a service interface for customer equipment 401, and a service interface for customer equipment 403 are interconnected by a multipoint-to-multipoint link 410 within the secure MAN network 350.

In point-to-multipoint virtual connections, multiple service interfaces are interconnected. One interface is configured as the root and the remaining interfaces are called leaves. FIG. 27 illustrates a point-to-multipoint link 415 within the secure MAN network 350. A service interface coupled to customer owned equipment 401 is designated root of the point-to-multipoint link 415. Service interfaces coupled to the customer equipment 400 and 403 respectively are designated leaves of the point-to-multipoint link 415. A customer-owned equipment device 401 attached to the root interface can send IP packets to any of the leaf interfaces. A customer-owned equipment 400, 403 device attached to a leaf interface can only send IP packets to the root interface. This service combines the logical addressing features of Frame Relay with the security features of a physical wire. The advantage to a service provider is that he can send packets to multiple subscribers securely while each subscriber is protected from deliberate or accidental transmission to the other subscribers.

Figure 28:
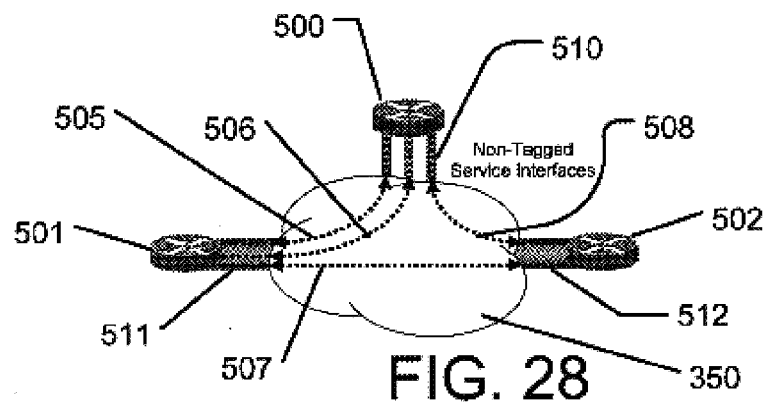
FIG. 28 illustrates the use of tagged and non-tagged service interfaces for access to a secure MAN network according to the present invention.

Multiple virtual connection services can be implemented on a single service interface, by tagging virtual connections. This is accomplished in this example embodiment by making use of IEEE 802.1Q VLAN tagging. Furthermore, virtual connection services between tagged and non-tagged service interfaces are supported. Non-tagged service interfaces support a single virtual connection connection. FIG. 28 shows an example of virtual connection services connecting between tagged and non-tagged service interfaces. In FIG.

28, customer equipment locations 500, 501 and 502 are connected by the point-to-point virtual connections 505, 506, 507 and 508 within the secure MAN network 350. Customer equipment 501 has three non-tagged service interfaces 510 supporting three virtual connections 505, 506 and 508. Customer equipment 501 includes service interface 511 which has three VLAN tags assigned to it, supporting virtual connections 505, 506 and 507. Customer equipment 502 includes service interface 512 having two VLAN tags assigned to it, supporting virtual connections 507 and 508.

In the provisioning of virtual connections, a variety of parameters relevant to the control of traffic on the wire are assigned in some situations. For example, a virtual connection service preferably has at least one bandwidth profile associated with it. The amount of bandwidth is provisioned at the customer's request and the price of the virtual connection service will be related to the "size" of the profile and the degree that the customer's actual transmitted traffic conforms to the profile. In return for abiding by the traffic profile, the customer receives a commitment on performance of the virtual connection service.

Another parameter associated with virtual connections is class of service in some embodiments. Virtual connection services can carry multiple classes of service. The class of service for each packet is indicated by the DS byte in the IP header as per the DiffServ standard. See, [RFC2475] D. Black, S. Blake, M. Carlson, E. Davies, Z. Wang, and W. Weiss, "An Architecture for Differentiated Services", Internet RFC 2475, December 1998; and [RFC2474] K. Nichols, S. Blake, F. Baker, and D. Black, "Definition of the Differentiated Services Field (DS Field) in the IPv4 and IPv6 Headers", Internet RFC 2474, December 1998. Each class of service has a set of performance objectives that address topics such as availability, delay, and loss. The performance objectives only apply while the traffic being offered to the virtual connection service conforms to the bandwidth profile.

Allocation and Configuration of Secure MAN Resources

Virtual connection services can be automatically provisioned as described above. This allows a network manager to control secure MAN services, from his or her own workstation. For example, a new virtual connection service can be established or an existing one can be modified in this fashion. Logical provisioning is supported by actual allocation and configuration of the resources of the secure MAN. In this example, the allocation and configuration is accomplished as described below.

Virtual connections are established by Physical Layer (layer 1) and data link layer (layer 2) contructs. Two physical layers are available in this example for service interfaces. The first is Fast Ethernet (100 Mb) as defined IEEE Std. 802.3. The second physical layer is Gigabit Ethernet (1 Gb) as defined in IEEE Std. 802.3.

Virtual connection service allows the exchange of IP packets among two or more service interfaces. Virtual connection services are established through the provisioning service. The wires are established at layer 2 using MAC addresses of the demarcation devices and VLAN tags.

The source and destination MAC addresses and the value of the DSCP in the IP header govern the handling of an IP packet submitted over a service interface. The details of this process are described in this section. Service performance objectives are also described in this section.

Figure 29:
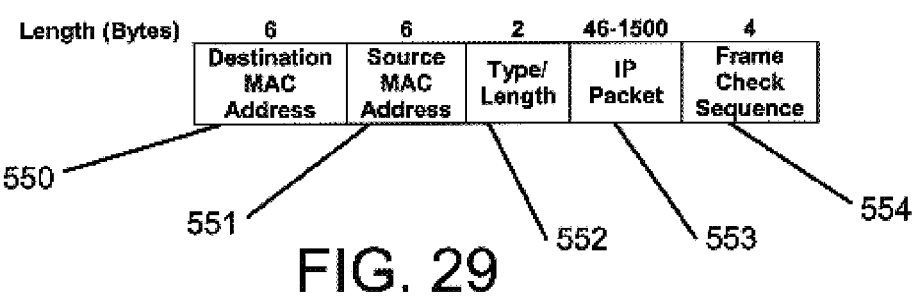
FIG. 29 shows a format for a packet transmitted within the secure MAN network of the present invention.

Two types of layer 2 protocols are supported; non-tagged and tagged. Non-tagged services. FIG. 29 illustrates the format of an IP packet has used in the secure MAN network of the present invention. The packet includes a destination MAC address which is six bytes in length, a source MAC address 551 which is the six bytes in length, a Type/Length field 552 which is two bytes in length, an IP packet payload 553 which is between 46 and 1500 bytes in length, and a frame check sequence field 554 which is four bytes in length.

Valid packets for the purposes of the secure MAN have a value of the Type/Length field greater than 0x5DC: 0x0800 designating an IP datagram and, 0x0806 designating an Address Resolution Protocol packet, or 0x0835 designating a Reverse Address Resolution Protocol packet. If the value of the Type/Length field is not one of these values, the packet is not considered properly formatted in this example.

When a unicast MAC address is used in the destination MAC address field, it must be a globally administered MAC address for the packet to be considered properly formatted. Similarly, the unicast MAC address in the source MAC address field must be a globally administered MAC address for the packet to be considered properly formatted.

A packet sent from the customer-owned equipment to a non-tagged service interface with an IEEE802.1Q tag is not properly formatted.

Tagged packets include in addition a VLAN tag field recognized in the network, for the packet to be considered valid.

The basic connectivity of all virtual connection services can be described as follows. If the customer-owned equipment sends an invalid packet, it is discarded. If the customer-owned equipment sends a valid packet, the service delivers the packet to the appropriate destination service interface(s) for the configured virtual connections identified by the packet addresses. Packets delivered to a destination service interface have the same format as that on the source service interface. In the case of a packet sent between non-tagged service interfaces, the contents of the delivered packet are unchanged.

For a packet to be delivered across by the service, it must be properly formatted and have a recognized source MAC address. Such a packet is called a valid packet. The secure MAN network discards all invalid packets sent across a service interface by customer-owned equipment.

A MAC address becomes recognized in one of two ways: using dynamic source MAC address or latched source MAC address processes. Each technique is described in the following sections.

In the case of the dynamic source MAC address process, the secure MAN network observes the source MAC address being used at the service interface. When a particular source MAC address is first observed on the service interface, the packets carrying the MAC address, either as Source or Destination, will be discarded for a period of time not to exceed 5 seconds, for example. This is done to allow secure MAN to make security checks and ensure the uniqueness of the MAC address. If the new MAC address is already being recognized at another service interface, the resolution is as described below.

If a particular source MAC address is observed and a different MAC address has been recognized for less than 5 minutes for example, the service interface is declared to be in the "Onlooker" state. The use of the Onlooker state is to prevent a repeater hub from being attached to a service interface with more than one customer-owned equipment attached. While the service interface is in this state, all packets sent to and from the service interface are discarded. The state is maintained until a MAC address remains continuously recognized for 5 minutes.

The recognized MAC address becomes unrecognized if the customer-owned equipment disconnects from the service interface.

In the case of the latched source MAC address process, when a MAC address is "latched" on a given Service interface, its MAC address will be recognized at the service interface no matter what other source MAC addresses are observed on the service interface in question or on any other service interface within the metropolitan area.

A MAC address can become latched in two ways. In the first method, the customer uses the provisioning system to latch the currently recognized MAC address. In the second method, the customer uses the provisioning system to put the service interface in "unlatched" mode. Then the source MAC address in the next properly formatted packet becomes the recognized and latched MAC address for the service interface provided it is unique across all service interfaces within the metropolitan area. If the new source MAC address is already being recognized at another service interface, the conflict is resolved as described below.

When the MAC address is first recognized, packets carrying the MAC address, either as source or destination, will be discarded for a period of time not to exceed 5 seconds, for example.

When a MAC address is "proposed" for recognition through any of the above methods, there is a check to see if the same MAC address is recognized at any other service interface in the metropolitan area. If there is a conflict, an error condition is noted by the network management system.

If the old and new service interfaces belong to different Accounts, the MAC address remains recognized at the old service interface.

If the old and new service interfaces belong to the same account, the MAC address will be recognized at either the new or old service interface.

The choice of the service interface where the MAC address will be recognized shown in Table 6 is dependent on the method used to establish recognition at the old service interface and the method being used at the new service interface.

TABLE 6

Service Interface Where MAC Address is Recognized - Single Account

| | | Old service interface | |
| --- | --- | --- | --- |
| | | Latched | Dynamic |
| New service interface | Latched | Old service interface | New service interface |
| | Dynamic | Old service interface | See Text |

The case where both recognitions are based on dynamic learning is a special case. If the MAC address had been recognized at the old service interface for more than 1 minute, the MAC address becomes recognized at the new service interface. Else, the MAC address remains recognized at the old service interface. The reason for this procedure is to distinguish between duplicate MAC addresses and the legitimate move of customer-owned equipment from one service interface to another.

The system also checks for duplicate MAC addresses across metropolitan areas. However, this need not be done in real time. Furthermore, if a conflict is discovered across metropolitan areas, the customers involved will be notified. This will be done by notifying the contacts for the service interfaces as defined in the account provisioned for the service interface. The MAC addresses involved will continue to be recognized thus connectivity will not be impacted.

For point-to-point service, two service interfaces are associated. Packets sent into one of the service interfaces can only be delivered to the other service interface and vice-versa. The rules for delivery or discard for a packet sent into a service interface are based on the source and destination MAC addresses of the packets. These rules are laid out in Table 7.

TABLE 7

Delivery and Discard for point-to-point virtual connection service

| Source MAC address | Destination MAC address | Result |
| --- | --- | --- |
| Unrecognized or Recognized at other than the Source service interface | Any | Discard |
| Recognized at Source service interface | Unicast and not Recognized at other service interface | Discard |
| Recognized at Source service interface | Unicast and Recognized at other service interface | Deliver |
| Recognized at Source service interface | Multicast | Deliver |
| Recognized at Source service interface | Broadcast | Deliver |

For point-to-multipoint service, two or more service interfaces are associated. One of the service interfaces is designated as the Root while each remaining service interface is designated as a Leaf. The rules for delivery and discard for packets sourced at the Root are detailed in Table 8. The rules for delivery and discard for packets sourced at a Leaf are laid out in Table 9.

TABLE 8

Delivery and Discard for the Root service interface

| Source MAC address | Destination MAC address | Result |
| --- | --- | --- |
| Unrecognized or Recognized at other than the Root service interface | Any | Discard |
| Recognized at Root service interface | Unicast and not Recognized at a Leaf service interface | Discard |
| Recognized at Root service interface | Unicast and Recognized at a Leaf service interface | Deliver to the Leaf service interface |
| Recognized at Root service interface | Multicast | Deliver to all Leaf service interfaces |
| Recognized at Root service interface | Broadcast | Deliver to all Leaf service interfaces |

TABLE 9

Delivery and Discard for a Leaf service interface

| Source MAC address | Destination MAC address | Result |
|---|---|---|
| Unrecognized or Recognized at other than the Source service interface | Any | Discard |
| Recognized at Source service interface | Unicast and not Recognized at the Root service interface | Discard |
| Recognized at Source service interface | Unicast and Recognized at the Root service interface | Deliver to the Root service interface |
| Recognized at Source service interface | Multicast | Deliver to the Root service interface |
| Recognized at Source service interface | Broadcast | Deliver to the Root service interface |

In multipoint-to-multipoint service, two or more service interfaces are associated. When there are only two service interfaces, the result is very similar to point-to-point virtual connection service. Most customers will have three or more service interfaces associated for this service. The rules for delivery and discard are presented in Table 10.

TABLE 10

Delivery and Discard for mesh multipoint-to-multipoint virtual connection service

| Source MAC address | Destination MAC address | Result |
|---|---|---|
| Unrecognized or Recognized at other than the Source service interface | Any | Discard |
| Recognized at Source service interface | Unicast and not Recognized at an associated service interface | Discard |
| Recognized at Source service interface | Unicast and Recognized at an associated service interface | Deliver to the associated service interface |
| Recognized at Source service interface | Multicast | Deliver to all other associated service interfaces |
| Recognized at Source service interface | Broadcast | Deliver to all other associated service interfaces |

Multiple classes of service are supported. Virtual connection service treats packets with different classes of service differently. The net effect is that the performance objectives vary by class of service.

There are two alternative methods in this example secure MAN network for determining the class of service for a packet:

A service interface can be configured such that all packets transmitted from the customer-owned equipment are treated with a specified class of service.

The Differentiated Services byte (DS byte) in the IP header identifies the class of service for a packet.

Examples of class of service include standard data service and expedited service. Standard data service is the service that gives the lowest level of performance and corresponds to what is currently available in IP networks. When the class is determined by the DS byte, the value 00000000 (binary) identifies fast data service. This is also the default Class of Service.

When fast data service is provisioned within an instance of virtual connection service, a bandwidth profile is specified. This causes the reserving of appropriate resources within the secure MAN network. When a fast data service packet is sent across the service interface into the secure MAN network, the virtual connection service will treat the packet as follows:

If the packet conforms to the bandwidth profile, the performance objectives for fast data service apply.

Else, no performance objectives apply.

Expedited service has significantly better performance objectives than fast data service. The values of the DS Byte for this class are 10111000 (binary) and 10100000 (binary).

When expedited service is provisioned within an instance of virtual connection service, a bandwidth profile is specified. This causes the reserving of appropriate resources within the secure MAN network. When a secure MAN Expedited Service packet is sent across the service interface into the secure MAN network, the virtual connection service will treat the packet as follows:

If the packet conforms to the bandwidth profile, the performance objectives for expedited service apply.

Else, no performance objectives apply.

In each instance of virtual connection service where the DS byte is used to determine the class of service for a packet, a minimum bandwidth profile and allocation of network resources are made for expedited service. The customer can increase this allocation through the provisioning system but the allocation can never be reduced below this minimum.

Additional classes of service and unrecognized DSCPs may also be provided for in the secure MAN.

When the DS byte is being used to determine the class of service, a packet sent across the service interface into the secure MAN network that has a DS byte value other than those specified is treated as a standard data service packet. Additional classes of service may be supported in the future.

Bandwidth profile is one parameter which may be associated with a virtual connection, or with other aspects of an account in the provisioning system. A bandwidth profile denoted BW(A,B) is based on two parameters:

B—the Maximum Burst Size (bytes)

A—the Average Bandwidth (bytes/msec)

Let $\{t_i\}$ denote the times that packets are received (arrival of the last bit) by the SIU and let $\{l_i\}$ be the lengths of the packets in bytes. Two quantities, $b(t_i)$ and $b'(t_i)$ are computed and the conformance of each packet to the Bandwidth Profile is determined by the following algorithm:

Step 1: Set $b'(t_i)=\min\{b(t_i)+A(t_i-t_{i-1}),B\}$.

Step 2: If $l_i \leq b'(t_i)$, then the $i^{th}$ packet is conforming to the Bandwidth Profile and set $b(t_i)=b'(t_i)-l_i$; else the $i^{th}$ packet is not conforming and set $b(t_i)=b'(t_i)$.

The bandwidth profile can be thought of as a token bucket. Every millisecond, tokens, each representing a byte are added to the bucket at a rate equal to the average bandwidth. Each time a packet is received, tokens equal to the length of the packet are removed from the bucket. An arriving packet is conforming if the bucket contains at least the length of the packet in tokens.

Figure 30:
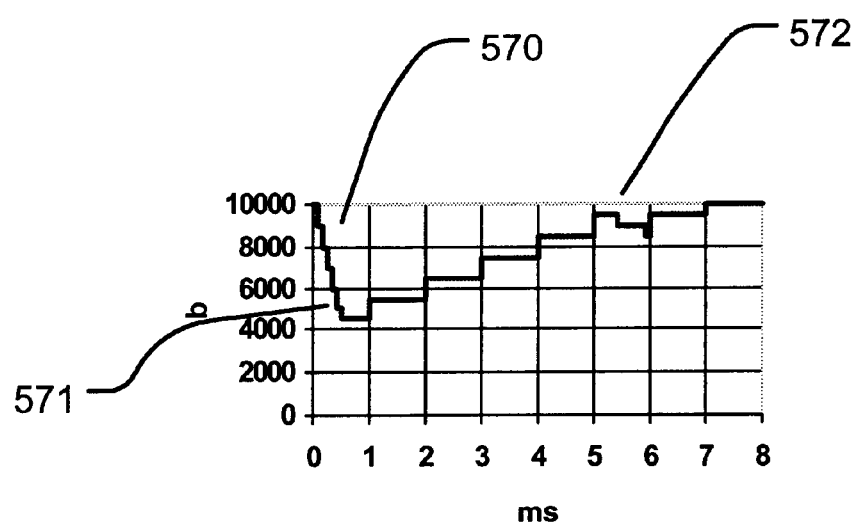
FIG. 30 is a graph for illustration of the operation of the bandwidth control algorithm according to one aspect of the present invention.

FIG. 30 illustrates the operation of the bandwidth algorithm. In this example, B=10,000 bytes and A=1000 bytes/msec (8 Mbps). In the first ms, 4, 1000 byte packets are received back-to-back in region 570 (assuming a 100 Mbps transmission rate) followed by a 500-byte packet in region 571. The next packets are not received until after 5 ms in region 572 of the graph. In this example, all packets conform to the bandwidth profile. If a received packet caused the trace in the graph to dip below the length of the packet, then the profile would be violated. So if b was driven below 1000, and a packet of length 1500 was received, a violation is detected.

A bandwidth profile is associated with each class of service in an instance of virtual connection service.

Packets that do not conform to the bandwidth profile are treated as fast data service packets. This means that secure MAN Expedited Service packets that are not conformant, count against the standard data service bandwidth profile. Thus it is possible that an expedited service packet could be found to be non-conformant with both the expedited service bandwidth profile and the standard data service bandwidth profile and thus no performance objectives apply to this packet.

Implementation of virtual connections that are part of secure MAN transmission service with respect to the switches in the secure MAN like that shown in FIG. 25 is described in the following sections.

There are three types of virtual connection in this example, including point-to-point virtual connection, point-to-multipoint virtual connection and multipoint-to-multipoint virtual connection.

Point-to-point virtual connections serve unicast IP packets from one routed point and addressed to the other routed point, which are delivered to the other routed point, as are broadcast and multicast packets. Non-IP packets are discarded by this example service. It is envisioned that IP technology and services will evolve with time without departing from the present invention.

When a point-to-point virtual connection is provisioned, endpoints of virtual connection (service interfaces that will be attached to this virtual connection and demarcation devices attached to those service interfaces) are identified. Point of Presence POP switches, also called access switches and switch ports connected to demarcation devices are also identified.

Selection and configuration of a VLAN in support of virtual connections in this example secure MAN is done using network zones. Network Zones are defined in order to optimize VLAN broadcast/multicast containment. Demarcation devices are grouped within Network Zones. Typically, the grouping will correspond to geographic location, but this is not a requirement.

To assign a VLAN ID to Virtual connection, the Network Zones in which endpoints of the virtual connection reside are identified. It is determined if both endpoints are in the same zone or not. Each Network Zone in a metro area has some number, say 50, VLANs assigned to it. Some of the assigned VLANs, say 25 VLANs, are designated as Intra-Zone VLANs and are used for point-to-point virtual connections that originate and terminate in the same zone. The others of the assigned VLANs are designated as InterZone VLANs and are used for point-to-point virtual connections that span multiple zones. VLANs must be assigned such that no two Virtual connections configured in any one demarcation device use the same VLAN id. Otherwise, cross talk between the two Virtual connections will occur.

Conceptually, VLAN assignments can be maintained in a table in order to satisfy the requirements for mutual exclusion and network optimization. Table 11 is illustrative of VLAN assignment maintenance:

TABLE 11

| VLAN id | Metro Area id | Virtual connection id | Demarcation id |
|---------|---------------|----------------------|----------------|
| 2       | 10            | LW0001               | D0001          |
| 2       | 10            | LW0001               | D0002          |
| 27      | 10            | LW0002               | D0001          |
| 27      | 10            | LW0002               | D0005          |
| 52      | 10            | LW0003               | D0001          |
| 52      | 10            | LW0003               | D0004          |

The following equations are used to calculate the VLAN ID that is to be configured on service interfaces being provisioned for a IntraZone point-to-point virtual connection.

Let D1 and D2 denote the demarcation devices corresponding to the first and second endpoints specified in a point-to-point provisioning request respectively.

The VLAN ID will be assigned from the range of IDs assigned to the Zone for IntraZone use. The starting value of the range is computed from the following formula, where Network Zone Number is a unique number assigned to the Network Zone in a metropolitan area.:

$$\text{Vid-Min}_{IntraZonevirtual\ connection}=((\text{Network Zone Number}-1)\text{MODULO }20)*50+2$$

Service center IDs (also called network zone IDs) may be assigned sequentially in a metro area starting with 1. This makes the maintenance and calculations easy. If not assigned sequentially, a mapping table is created that maps a service center ID to a VLAN ID address space.

Once the VLAN ID range is identified, the lowest VLAN ID that is not in use on both D1 and D2 is used.

The highest permissible VLAN ID value for IntraZone Point-to-Point Virtual connection is Vid-Min+25.

The following equation is used to calculate the VLAN ID that is to be configured on service interfaces being provisioned for a InterZone point-to-point virtual connection.

Let D1 and D2 denote the demarcation devices corresponding to the first and second endpoints specified in a point-to-point provisioning request respectively. A VLAN ID will be selected from the least used range of the two participating Zones. The starting value of the range associated with D1 and D2 are computed from the following formulas:

$$\text{Vid-Min-D1}_{InterZonevirtal\ connection}=((\text{Network Zone Number}(D1)-1)\text{MODULO }20)*50+27$$

$$\text{Vid-Min-D2}_{Interzonevirtual\ connection}=((\text{Network Zone Number}(D2)-1)\text{MODULO }20)*50+27$$

For each demarcation device, find the lowest VLAN ID in the computed range, that is not already in use within the device.

From the two possible VLAN ID values, choose the lowest ID with respect to the range of each. For example, if the computed Vid-Min-D1 value is 27, with 27–30 in use on D1, and Vid-Min-D2 is 127, with 127–128 in used, the VLAN ID 129 will be assigned, since its value with respect to 127 (2) is lower than ID 31 with respect to 27 (4).

Selected VLAN is configured on identified demarcation devices; identified service interfaces are configured in the new VLAN. Service interfaces are configured to receive only untagged frames and only the selected VLAN is allowed out of service interfaces (untagged). Network ports (towards secure MAN network) on demarcation devices are configured in the new VLAN allowing only tagged frames to pass through.

A selected VLAN is configured on identified POP switches (if not already configured). The access port on the POP switch connected to identified demarcation device is configured in the selected VLAN allowing only tagged frames in and out of the port. If POP switch supports the Generic VLAN Registration Protocol GVRP, the upstream port (s) will propagate this VLAN to local switches. Upstream switches will propagate this VLAN in other parts of the network. The upstream ports (from the POP switch) will also process the incoming GVRP requests.

If GVRP is not supported by a POP (and/or local/regional) switch, VLANs are configured manually on all switches and ports in the path between the endpoints of the virtual connection (including redundant paths). By "manual configuration," it is meant that the configuration files are not self-propagating, such as in a protocol like GVRP, but require some user intervention to set up and/or modify across the network.

Security filters are configured as part of the process of provisioning virtual connections. When the customer endpoint (demarcation device MAC address) is known on a service interface being provisioned, the MAC address is configured in a source address filter on the access port on the POP switch. This filter forces packets out of the port coupled to a customer access point (if on the same POP switch) or network port (if not on the same POP switch). This source address filter is also configured on the network port of the other POP switch (connected to other endpoint of virtual connection, if required) forcing packets out of the correct access port.

If the customer endpoint is unknown at the current time, the above filter configuration is done after a successful authentication has been performed after learning the endpoint MAC address.

Examples of secure MAN configurations for point-to-point virtual connections are given in FIGS. 31–34.

Figure 31:
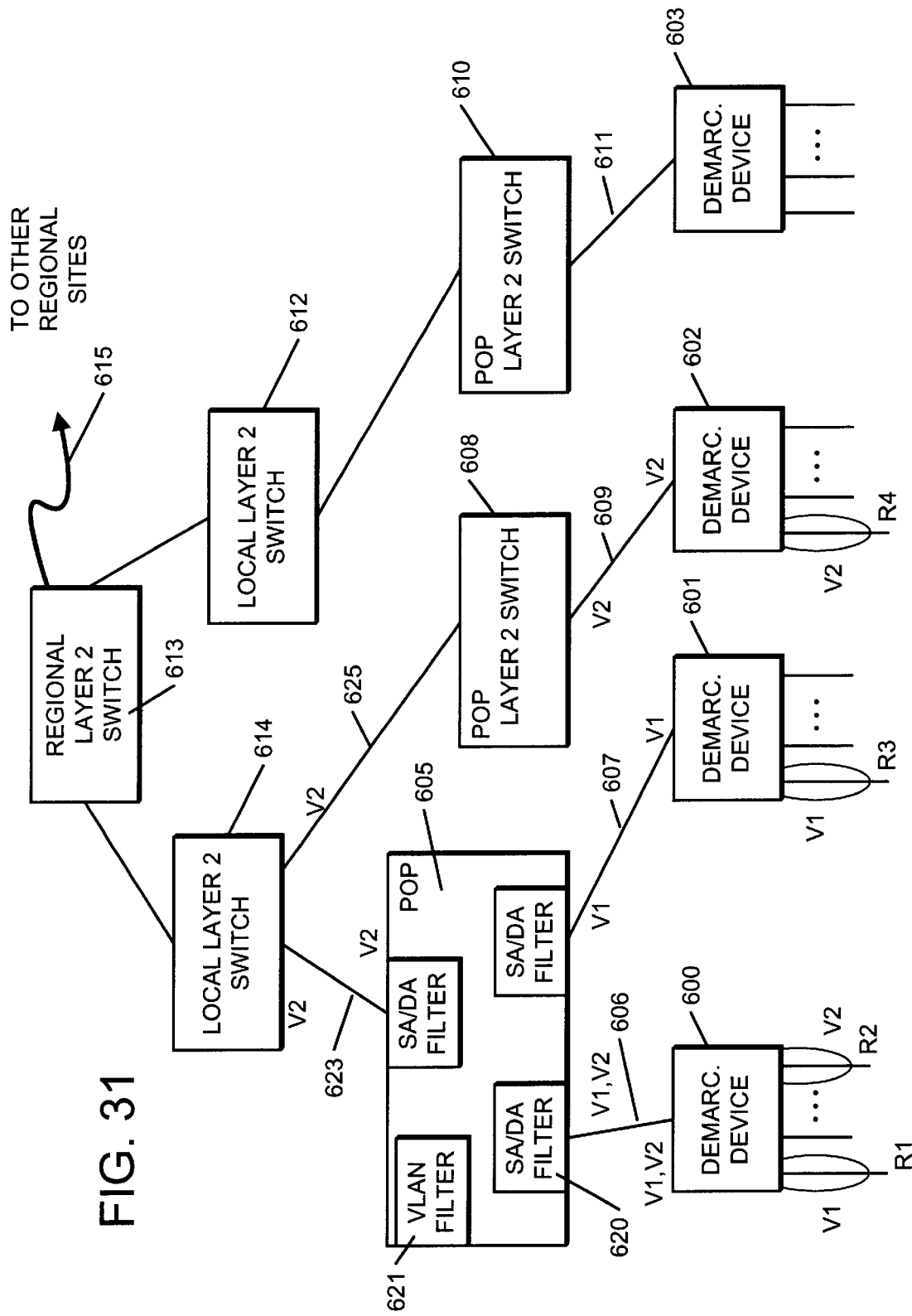
FIG. 31 illustrates a simplified secure MAN network, and configuration of a virtual connection is within such network.

FIG. 31 illustrates a secure MAN arranged in one example configuration. The secure MAN includes a plurality of demarcation devices, in this example demarcation devices 600, 601, 602 and 603 are illustrated. The demarcation devices are connected to point of presence POP switches in the secure MAN. Thus, the demarcation devices 600, 601 are coupled to the POP switch 605 across lines 606 and 607 respectively. Demarcation device 602 is coupled to POP switch 608 across line 609. Demarcation device 603 is coupled to POP switch 610 across line 611. The POP switches 604, 608, 610 are connected to local layer 2 switches 614 and 612. Though local layer 2 switches 614, 612 coupled to a regional layer 2 switch 613. The regional layer 2 switch 613 may be coupled to other regional sites by a long haul network or otherwise as indicated by the arrow 615. Switches 613, 612, 614, 605, 608, 610 may be in collocation sites.

The hierarchy illustrated in FIG. 31 is merely one example. A wide variety of architectures for the switches could be utilized according to the present invention. For example, a regional switch may also act as a POP switch, and local switches may not be used. For simplicity, redundancy is omitted from the example, although such redundancy would be implemented in many instances of the invention.

Two virtual connections V1, V2 are illustrated in FIG. 31. Virtual connection V1 is a point-to-point channel between the service interface R1 on demarcation device 600 and R3 on demarcation device 601. The virtual connection V2 is a point-to-point channel between the service interface R2 on demarcation device 600, and the service interface R4 on demarcation device 602.

Each of the layer 2 switches in the network illustrated can be implemented using a basic layer 2 architecture such as that illustrated in connection with the POP switch 605. Each port of the switch includes a source address and destination address filter 620. Also, associated with the switch 605 is a VLAN filter 621. The demarcation devices 600–603 include client side ports, such as the ports R1 through R4, and one or more service access port and such as the port coupled to line 606. In one embodiment, the client side ports and receive layer 2 packets carrying source and destination addresses followed by Type field and an Internet Protocol payload as well-known the art. At the demarcation device 600, a VLAN tag is added to the frame, to associate the tag with a virtual connection.

In operation, the demarcation device 600 sends a frame from port R1 out on line 606 and carrying the VLAN tag V1. The source/destination address filters (e.g. 620) in the switch 605 are configured to recognize the source and destination addresses of the frame. The frame will be accepted in the switch at the port only if it has a recognized source address on that port. The VLAN filter 621 on the switch 605 will identify the outgoing ports on the switch 605 which are configured to receive the packet carrying that VLAN tag and that source address. Thus, a port coupled to line 620 passes the packet received from the port R1 on line 620 to the local layer 2 switch 614. Likewise, the port coupled to line 607 passes the packet carrying the VLAN tag V1 towards the port R3. The VLAN filter 621 recognizes the packet as a member of the virtual connection V1, and allows it to be sent outgoing on the port coupled to line 620 and on the port coupled line 607.

For the virtual connection V2, the source and destination address filter 620 accepts the packet at switch 605. The VLAN filter 621 limits the outgoing path for the packet to the port connected to line 620. The packet is forwarded up the tree towards the local layer 2 switch 614. Layer 2 switch 614 allows the packet to be transmitted only on line 625 to the POP layer 2 switch 608.

As can be seen in FIG. 31, virtual connections remain confined to their logic Network Zone delimited by the local switches 611, 612, i.e., V1 and V2 never cross the Network Zone 1 boundary above local switch 1. The upstream port on local switch 1 is not a member of V1 or V2. Therefore packets in V1 and V2 are not forwarded by local switch 1 on its upstream port to the regional switch. At the same time, source address filters ensure delivery of packets to only the correct recipient.

Figure 32:
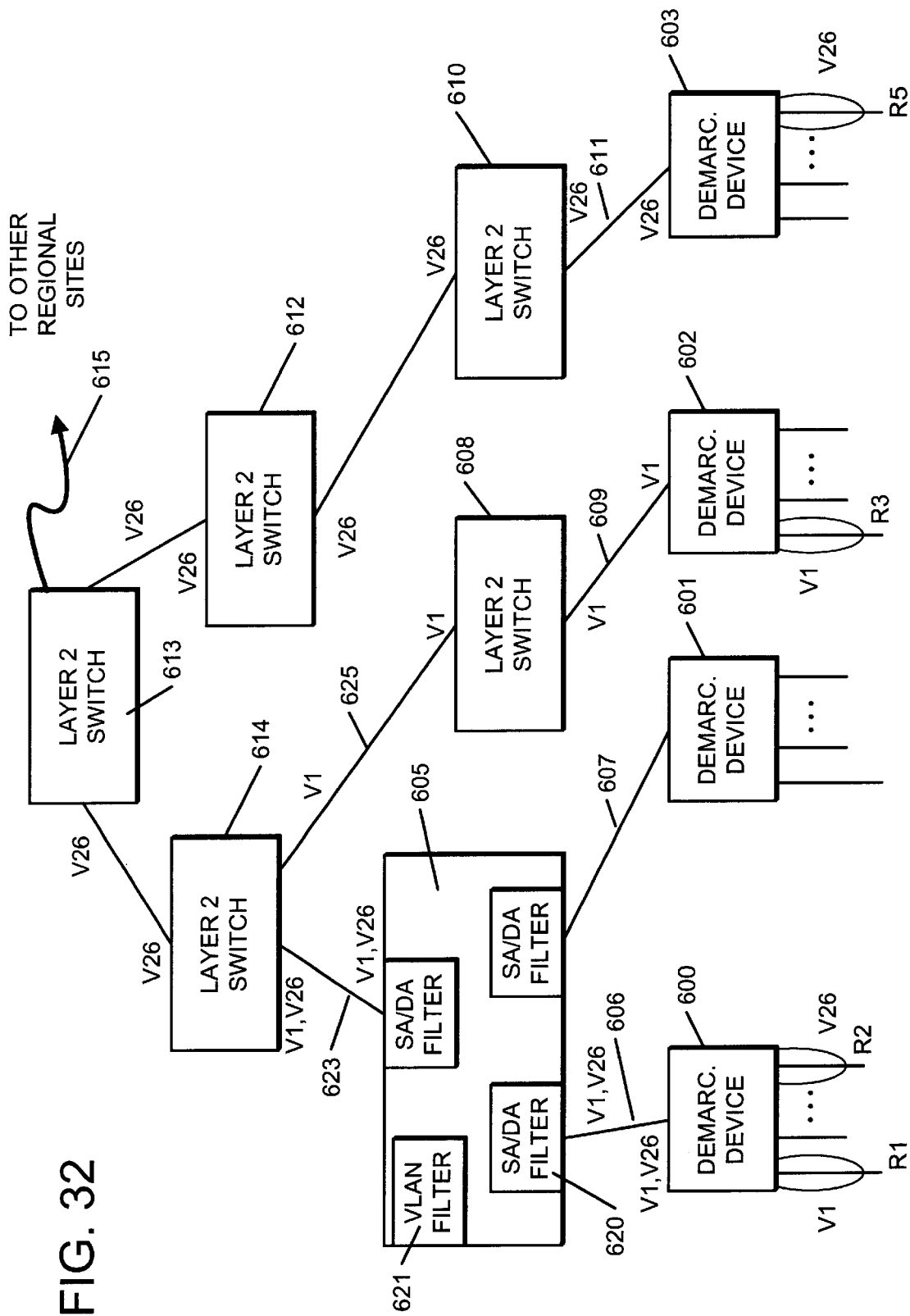
FIG. 32 illustrates a simplified secure MAN network as in FIG. 31, with another example configuration of a virtual connection.

In FIG. 32, the network switch and access point configuration and VLAN ID assignment remains the same. However, a point-to-point virtual connection is provisioned between R1 and R3 in the Network Zone served by local switch 614 while another virtual connection is provisioned between R2 and R5 served by local switch 614 and local switch 612 respectively, and thus across Network Zones. For simplicity, redundancy is omitted. VLAN ID V26 is selected for non-local virtual connection from R2 to R5.

Only VLAN 26 crosses the Network Zone boundry. Local VLANs in Network Zone 1 remain local. Local switch 1 propagates V26 to its upstream regional switch thus creating a forwarding path across the regional switch 613 to local switch 612 and demarcation device 603.

For the embodiment of FIG. 32, packets from the port connected to R1 in the virtual connection V1 are accepted in the source and destination address filter 620 of POP switch 605 and allowed to pass on the port connected to line 623 up to the layer 2 switch 614. The packets are blocked by the VLAN filter 621 on the other ports of the POP switch 605. At the switch 614, the packet from a virtual connection V1 is allowed out on the port coupled to line 625, and not on other ports. At switch 608, the packet in the virtual connection V1 is allowed out on the line 609 to the demarcation device 602, and onto the destination R3. Similar filtering occurs in the reverse direction from the end station R3 to the end station R1. Packets within the virtual connection V26 are allowed into the switch 605, and propagated to the switch 614. At switch 614, packets for virtual connection V26 are passed up to the switch 613, where they are propagated through of switch 612, switch 610 and onto the demarcation device 603 where they are delivered to the destination R5. The logical construct of network zones being defined by a layer of switches in a network, such as the switches 614 and 612 in his example, can be used for the management of the VLAN IDs, and other network addressing functions. In some embodiments of the network, no such network zone logical construct is necessary.

A point-to-multipoint virtual connection is used to connect one routed point to many routed points and is especially useful to deliver services to multiple customers simultaneously while maintaining isolation among customers themselves. A point-to-multipoint virtual connection is implemented as described below.

In a point-to-multipoint virtual connection, a unicast IP packet injected by the root node and destined to one of the leaf nodes is delivered to the leaf node while a multicast/broadcast packet is delivered to all leaf nodes. Unicast multicast and broadcast packets injected by a leaf node and destined to the root node are delivered to the root node. No packets from one leaf node are delivered to another leaf node though.

When a point-to-multipoint virtual connection is provisioned, the endpoints (service interfaces that will be attached to this virtual connection and demarcation devices attached to those service interfaces) are identified. POP switches (and access ports) connected to those demarcation devices are also identified.

A separate VLAN is used for each point-to-multipoint virtual connection. The lowest VLAN ID available in the range assigned to point-to-multipoint virtual connection is used to provision this virtual connection.

The selected VLAN is configured on the demarcation devices necessary to support the virtual connection; identified service interfaces are configured in the new VLAN. Service interfaces on the customer side are configured to receive only untagged frames and only the selected VLAN is allowed out of service interfaces (untagged). Network ports (towards the secure MAN network) on demarcation devices are configured in the new VLAN allowing only tagged frames to pass through.

The selected VLAN is configured on the POP switch (if not already configured). The access port on POP switch connected to the demarcation device is also configured in the selected VLAN allowing only tagged frames in and out of the port. If the POP switch supports GVRP, the upstream port(s) will propagate this VLAN to other parts of the network. The upstream ports will also process the incoming GVRP requests.

If GVRP is not supported by a POP switch (and/or local/regional switches), VLANs are configured manually on all switches and ports in the path between the root node and each leaf node on the virtual connection (including the redundant paths).

The configuration of security filters for a point-to-multipoint virtual connection is described with reference to the example in FIG. 33, which shows the same network switch configuration as FIGS. 31 and 32.

Generally, if the root node endpoint R2 (router MAC address) is known on a service interface being provisioned at demarcation device 603, the MAC address is configured in a source address filter on the access port on POP switch 610 (leading to the root node) allowing packets to be forwarded. For each known leaf node (whose MAC address is known) that resides on the same POP switch 610 as the root node, a source address filter (with leaf node's address) is configured on the leaf node port on the POP switch forcing packets to egress from the port leading to the root node.

For each known leaf node R4, R1 (whose MAC address is known) that resides on a different POP switch than the root node, a VLAN filter and/or a source address filter (with leaf node's address) is on the network port of the root POP switch 603, is/are configured allowing packets to egress from the port leading to the root node 615. On every POP switch 608, 600 that leads to one of the leaf nodes, a source address filter (with leaf node's address) on the access port is/are configured, allowing packets out of the network port. A source address filter (with root node's address) on the network port of the same POP switch and/or a VLAN filter also allows the packets to egress from the correct leaf node port.

If a customer endpoint (root node/leaf node) is unknown at the current time, the above filter configuration is done after a successful authentication when address of the endpoint is learned.

Figure 33:
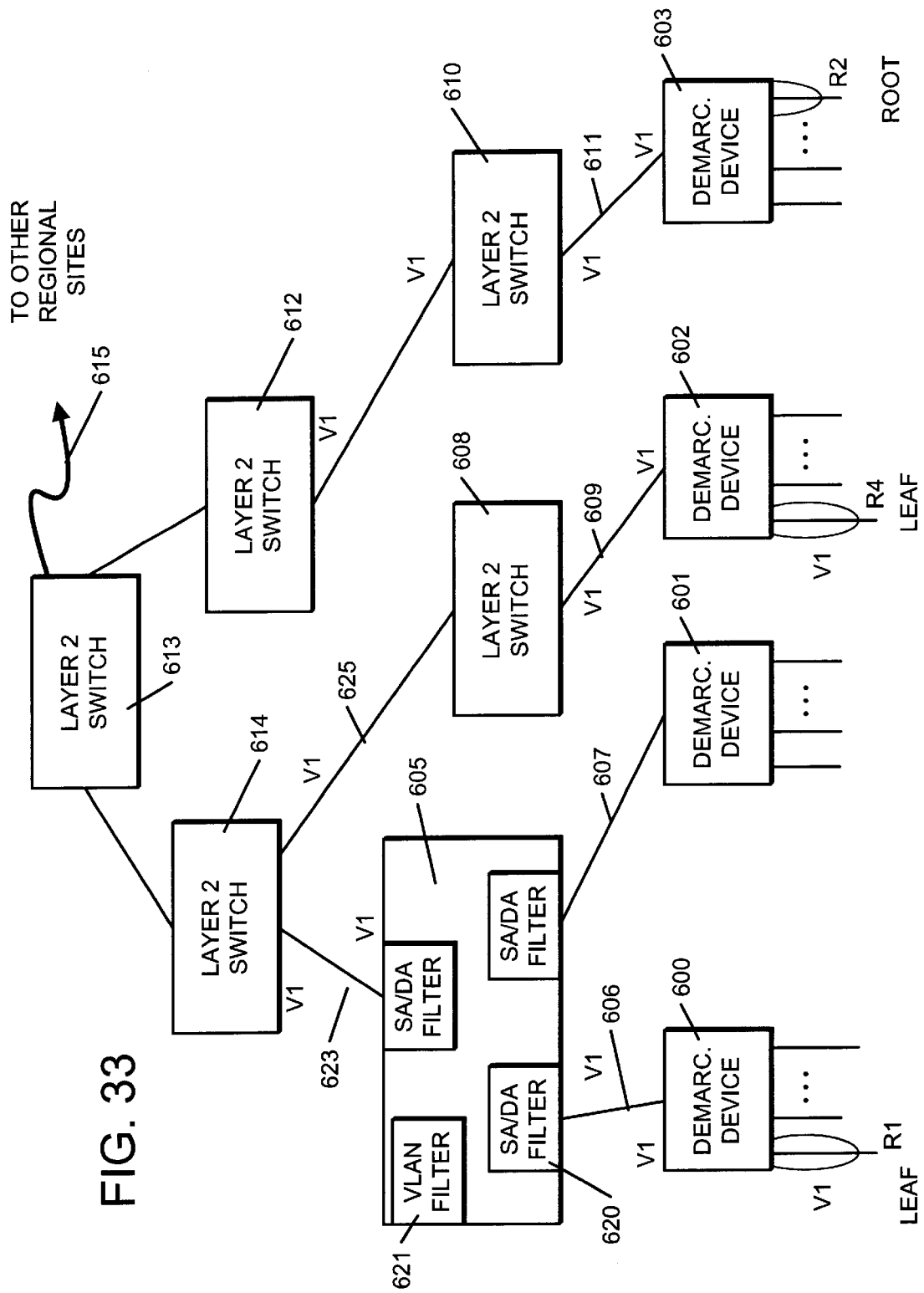
FIG. 33 illustrates a simplified secure MAN network as in FIG. 31, showing configuration for a point-to-multipoint virtual connection.

FIG. 33 shows a point-to-multipoint virtual connection from R2 to R1 and R4. As can be seen, the VLAN V1 crosses those branches that lead to member ports (root/leaf nodes). Security source address filters on POP switches ensure that the root node can reach all the leaf nodes (R1, R4) while leaf nodes (R1, R4) can only reach the root node (R2).

A multipoint-to-multipoint virtual connection is used to connect multiple routed points together and is especially useful to extend a campus LAN (minus bridging over the secure MAN network). The definition and implementation is described below for one embodiment.

In a multipoint-to-multipoint virtual connection, a unicast IP packet injected by a member and destined to one of the other members is delivered to the other member while a multicast/broadcast packet is delivered to all the members.

When a multipoint-to-multipoint virtual connection is provisioned, the endpoints (service interfaces) that will be attached to this virtual connection and demarcation devices attached to those service interfaces are identified. POP switches (and access ports) connected to demarcation devices are also identified.

A separate VLAN is used for each multipoint-to-multipoint virtual connection. The highest VLAN ID available in the range assigned to multipoint-to-multipoint virtual connection is used to provision this virtual connection. Selecting the highest available VLAN ID for a multipoint-to-multipoint virtual connection makes point-to-multipoint and multipoint-to-multipoint virtual connections consume VLAN IDs from opposite sides. Based on the customer demand, one type of virtual connections may consume more VLAN IDs than the other. If all the available VLAN IDs are consumed, they wrap around and start sharing already used VLAN IDs. It stretches the broadcast domain, but does not affect the service availability or security of secure MAN service.

The selected VLAN is configured on demarcation devices; identified service interfaces are configured in the new VLAN. Service interfaces are configured to receive only untagged frames and only the selected VLAN is allowed out of service interfaces (untagged). Network ports (towards the secure MAN network) on demarcation devices are configured in the new VLAN allowing only tagged frames to pass through.

The selected VLAN is configured on the POP switch (if not already configured). The access port on POP switch connected to the demarcation device is also configured in the selected VLAN allowing only tagged frames in and out of the port. If POP switch supports GVRP, the upstream port(s) will propagate this VLAN to other parts of the network. The upstream ports will also process the incoming GVRP requests.

If GVRP is not supported by a POP switch (and/or local/regional switches), VLANs are configured manually on all switches and ports in the path between all pairs of members on the virtual connection (including redundant paths).

Figure 34:
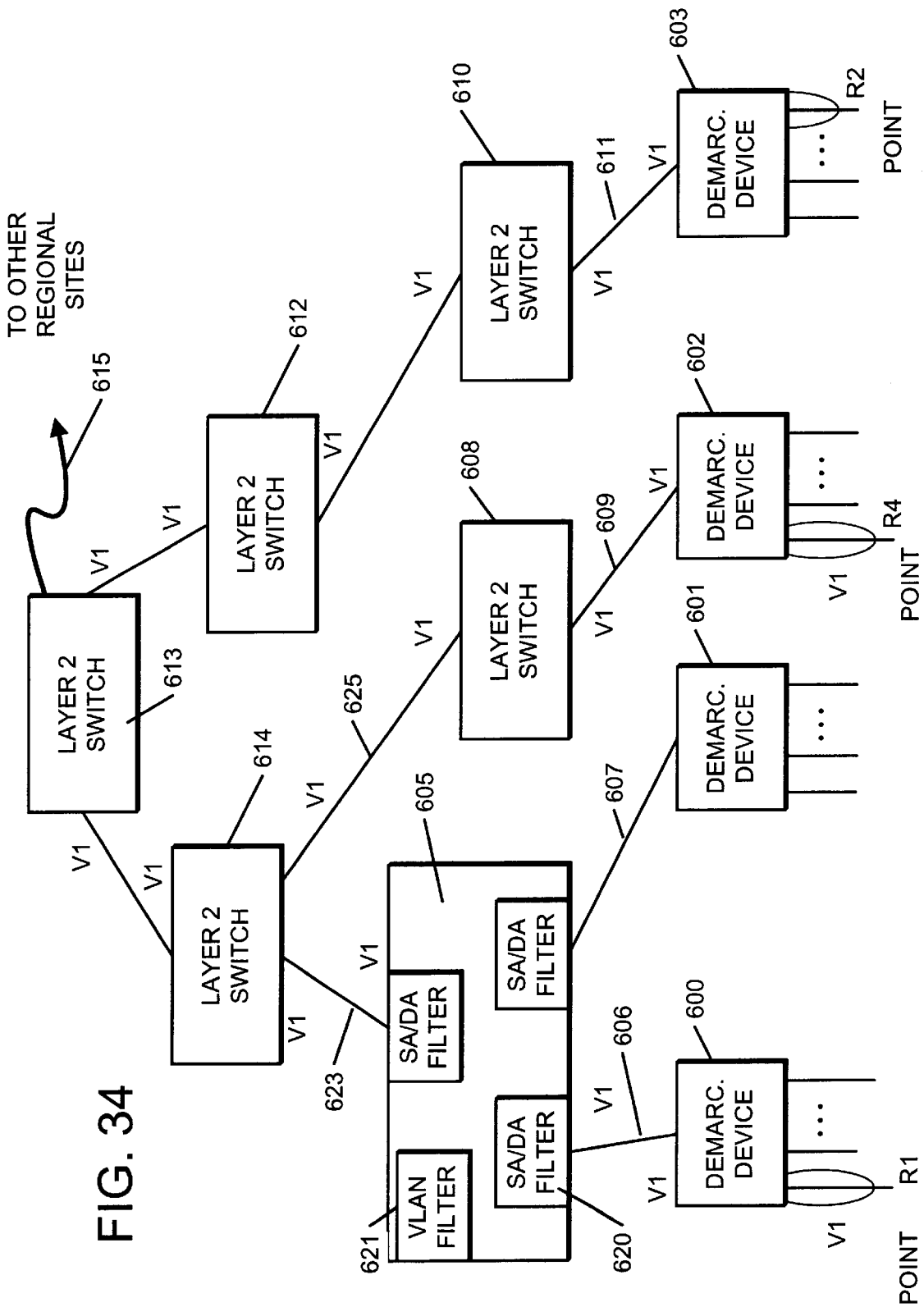
FIG. 34 illustrates a simplified secure MAN network as in FIG. 31, showing configuration for a multipoint-to-multipoint virtual connection.

Configuration of source address security filters can be understood with reference to the example in FIG. 34. Generally, if the endpoint R1 (e.g., router MAC address) is known on a service interface being provisioned, the MAC address is configured in a source address filter 620 on the access port on the POP switch 605. A source filter is also configured on the network port of those POP switches 608, 610 that lead to other member nodes on this virtual connection. This filter along with MAC address lookup on the egress POP switch will correctly deliver the unicast packets to the correct member node and multicast/broadcast packets to all member nodes on that switch.

If the customer endpoint is unknown at the current time, the above filter configuration is done after a successful authentication when address of the endpoint is learned.

FIG. 34 shows a multipoint-to-multipoint virtual connection among R1, R2, and R4. As can be seen, the assigned VLAN V1 is configured in the VLAN filters 621, to reach all member nodes while source address security filters on POP switches 605, 608, 610 allow any member to talk to any other member.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the appended claims.

What is claimed is:

1. A method of connecting communication links arranged in a plurality of rings which traverse a plurality of collocation sites, comprising:
    configuring switches in the plurality of collocation sites to partition rings in the plurality of rings into a plurality of link segments providing point to point paths between switches at collocation sites in the plurality of collocation sites; and
    managing the switches according to a spanning tree protocol;
    wherein said configuring includes allocating a first set of link segments as a first ring and a second set of link segments as a second ring, breaking the first and second rings by blocking transmission on a link segment in the first ring between a first pair of collocation sites, and by blocking transmission on a link segment in the second ring between a second pair of collocation sites, and cross-connecting the first and second rings by a communication link.

2. The method of claim 1, wherein there are two switches in each collocation site in the plurality, one switch of the two switches in each collocation site coupled to a link segment in the first ring and the other switch of the two switches each collocation site coupled to a link segment in the second ring.

3. The method of claim 1, wherein said communication link cross-connecting the first and second rings includes one or more link segments configured for point to point connection between a switch in the first pair of collocation sites and a switch in the second pair of collocation sites.

4. The method of claim 2, wherein said one switch in one of the collocation sites in the first pair of collocation sites is also coupled to the second ring via said communication link.

5. The method of claim 1, including aggregating a plurality of link segments between switches in different collocation sites to provide a single link with higher bandwidth between the collocation sites.

6. The method of claim 1, wherein the link segments comprise fiber optic cable.

7. The method of claim 1, wherein the link segments comprise transmit and receive pairs of fiber optic cable.

8. The method of claim 1, wherein said link segments provide bidirectional point to point paths.

9. A method of connecting communication links arranged in a plurality of rings which traverse a plurality of collocation sites, comprising:
    configuring switches in the plurality of collocation sites to partition first and second rings in the plurality of rings into respective first and second sets of link segments providing point to point paths between collocation sites in the plurality of collocation sites;
    breaking the first ring by blocking packet transmission on a first link segment on the first ring between a first pair of collocation sites;
    breaking the second ring by blocking packet transmission on a second link segment on the second ring between a second pair of collocation sites;
    connecting the first ring to the second ring by coupling a first particular switch on the first ring at a first collocation site with a second particular switch on the second ring at a different collocation site; and
    managing the switches according to a spanning tree protocol.

10. The method of claim 9, including aggregating a plurality of link segments between switches in different collocation sites to provide a single link with higher bandwidth between the collocation sites.

11. The method of claim 9, wherein there are two switches in each collocation site in the plurality, one switch of the two switches in each collocation site coupled to the first ring and the other switch of the two switches in each collocation site coupled to the second ring.

12. The method of claim 9, wherein said coupling a first particular switch at a first collocation site on the first ring to a second particular switch at a second collocation site on the second ring includes configuring one or more link segments of the plurality of rings for point to point connection between the first particular switch and the second particular switch.

13. The method of claim 9, wherein said coupling a first particular switch at a first collocation site on the first ring to a second particular switch at a second collocation site on the second ring includes configuring a plurality of link segments which are not part of the first and second rings for redundant point to point connection between the first particular switch and the second particular switch.

14. The method of claim 9, wherein the first particular switch is located in a collocation site in the first pair of collocation sited, and the second particular switch is located in a collocation site in the second pair of collocation sites.

15. The method of claim 9, wherein the link segments comprise fiber optic cable.

16. The method of claim 9, wherein the link segments comprise transmit and receive pairs of fiber optic cable.

17. The method of claim 9, wherein said link segments provide bi-directional point to point paths.

18. A metropolitan area network, comprising:
  a plurality of communication links arranged in a plurality of rings which traverse a plurality of collocation sites in the metropolitan area;
  a plurality of switches in the plurality of collocation sites configured to partition rings in the plurality of rings into a plurality of link segments providing point to point paths between switches at collocation sites in the plurality of collocation sites; and
  managing the switches according to a spanning tree protocol;
  wherein said plurality of switches are configured to allocate a first set of link segments as a first ring and a second set of link segments as a second ring, to break the first and second rings by blocking transmission on a link segment in the first ring between a first pair of collocation sites, and by blocking transmission on a link segment in the second ring between a second pair of collocation sites, and to link the first and second rings by a communication link not in the first and second sets of link segments.

19. The network of claim 18, wherein there are two switches in each collocation site in the plurality, one switch of the two switches in each collocation site coupled to a link segment in the first ring in the collocation site and the other switch of the two switches each collocation site coupled to a link segment in the second ring in the collocation site.

20. The network of claim 18, wherein said communication link includes one or more link segments configured for point to point connection between switches in the first and second rings.

21. The network of claim 19, wherein said one switch in a collocation site in the first pair of collocation sites is also coupled to the second ring via said communication link.

22. The network of claim 18, including aggregating a plurality of link segments between switches in different collocation sites to provide a single link with higher bandwidth between the collocation sites.

23. The network of claim 18, wherein the link segments comprise fiber optic cable.

24. The network of claim 18, wherein the link segments comprise transmit and receive pairs of fiber optic cable.

25. The network of claim 18, wherein said link segments provide bi-directional point to point paths.

26. A metropolitan area network, comprising:
  a plurality of communication links arranged in a plurality of rings which traverse a plurality of collocation sites in the metropolitan area;
  a plurality of switches in the plurality of collocation sites configured
    to partition first and second rings in the plurality of rings into respective first and second sets of link segments providing point to point paths between collocation sites in the plurality of collocation sites;
    to break the first ring by blocking packet transmission on a first link segment on the first ring between a first pair of collocation sites;
    to break the second ring by blocking packet transmission on a second link segment on the second ring between a second pair of collocation sites;
    to connect a communication channel between a first particular switch at a first collocation site on the first ring to a second particular switch at a different collocation site on the second ring; and
    to manage the switches according to a spanning tree protocol.

27. The network of claim 26, wherein the plurality of switches are configured to aggregate a plurality of link segments between switches in different collocation sites to provide a single link with higher bandwidth between the collocation sites.

28. The network of claim 26, wherein there are two switches in the plurality of switches in each collocation site in the plurality, one switch of the two switches in each collocation site coupled to the first ring and the other switch of the two switches in each collocation site coupled to the second ring.

29. The network of claim 26, wherein said communication channel between the first particular switch and the second particular switch includes one or more link segments of the plurality of rings for point to point connection between the first particular switch and the second particular switch.

30. The network of claim 26, wherein said communication channel between the first particular switch and the second particular switch includes a plurality of link segments which are not part of the first and second rings for redundant point to point connection between the first particular switch and the second particular switch.

31. The network of claim 26, wherein the first particular switch is located in a collocation site in the first pair of collocation sited, and the second particular switch is located in a collocation site in the second pair of collocation sites.

32. The network of claim 26, wherein the link segments comprise fiber optic cable.

33. The network of claim 26, wherein the link segments comprise transmit and receive pairs of fiber optic cable.

* * * * *